US012603187B2

(12) United States Patent
Makarewicz et al.

(10) Patent No.: US 12,603,187 B2
(45) Date of Patent: Apr. 14, 2026

(54) FLUID LEVEL CONTROL SYSTEM FOR A MOLTEN FUEL SALT SAMPLING TANK IN A NUCLEAR REACTOR SYSTEM

(71) Applicant: ABILENE CHRISTIAN UNIVERSITY, Abilene, TX (US)

(72) Inventors: Joseph Makarewicz, Abilene, TX (US); Aidan Boisvert, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 42 days.

(21) Appl. No.: 18/769,565

(22) Filed: Jul. 11, 2024

(65) Prior Publication Data

US 2025/0022624 A1     Jan. 16, 2025

Related U.S. Application Data

(60) Provisional application No. 63/512,973, filed on Jul. 11, 2023.

(51) Int. Cl.
*G21C 17/035*     (2006.01)
*G01F 23/14*     (2006.01)
(Continued)

(52) U.S. Cl.
CPC ........... *G21C 17/035* (2013.01); *G01F 23/14* (2013.01); *G21C 23/00* (2013.01); *G21C 19/02* (2013.01); *G21C 19/28* (2013.01)

(58) Field of Classification Search
CPC ...... G21C 17/035; G21C 23/00; G21C 19/28; G21C 19/02; G01F 23/14; G01F 23/00
(Continued)

(56) References Cited

U.S. PATENT DOCUMENTS 2,874,106 A     2/1959 Phillip
3,303,691 A     2/1967 Louis et al.
(Continued)

FOREIGN PATENT DOCUMENTS

CA     2995604     9/2023
CN     2646670     10/2004
(Continued)

OTHER PUBLICATIONS

Carberry, "Comprehensive Characterization of Molten Salt Reactor Source Terms, An Approach", PhD diss., Georgia Institute of Technology, 2022. (Year: 2022).*
(Continued)

*Primary Examiner* — Jack W Keith
*Assistant Examiner* — Daniel Wasil
(74) *Attorney, Agent, or Firm* — King & Spalding LLP

(57)     ABSTRACT

A molten fuel salt reactor system includes a fluid level control system configured to circulate a molten salt through a molten salt loop including an experimental tank, a sump tank, and a drain tank. The fluid level control system further includes a plurality of level sensors, pressure transducers, and electronic pressure regulators fluidically coupled with the fuel salt reactor system. The fluid level control system is configured to receive cover gas pressures in the headspaces of the tanks and calculate target fluid height setpoints for each of the tanks. The fluid level control system further invokes the electronic pressure regulator to iteratively adjust the cover gas pressures of the tanks to achieve and maintain a target fluid level in the experimental tank.

10 Claims, 14 Drawing Sheets

(51) Int. Cl.
  *G21C 23/00* (2006.01)
  *G21C 19/02* (2006.01)
  *G21C 19/28* (2006.01)

(58) Field of Classification Search
  USPC ................................................ 376/247, 340
  See application file for complete search history.

(56) References Cited

U.S. PATENT DOCUMENTS

| | | | |
|---|---|---|---|
| 3,521,959 A | 7/1970 | Fassel et al. |
| 4,374,477 A | 2/1983 | Kikuchi et al. |
| 4,454,774 A | 6/1984 | Pridgen |
| 4,539,846 A | 9/1985 | Grossman |
| 4,774,050 A | 9/1988 | Impink |
| 4,779,453 A | 10/1988 | Hopenfeld |
| 4,783,997 A | 11/1988 | Lynnworth |
| 4,948,552 A | 8/1990 | Mollot et al. |
| 4,961,347 A | 10/1990 | Arakawa |
| 5,275,060 A | 1/1994 | Lynnworth |
| 5,280,728 A | 1/1994 | Sato et al. |
| 5,408,890 A | 4/1995 | Klaus |
| 5,440,930 A | 8/1995 | Daire et al. |
| 5,450,753 A | 9/1995 | Maynor |
| 5,824,915 A | 10/1998 | Hujzer et al. |
| 6,047,602 A | 4/2000 | Lynnworth |
| 6,125,912 A | 10/2000 | Branagan et al. |
| 6,143,431 A | 11/2000 | Webster |
| 6,258,185 B1 | 7/2001 | Branagan et al. |
| 6,318,192 B1 | 11/2001 | Carbone |
| 6,490,927 B2 | 12/2002 | Braunling et al. |
| 6,710,335 B2 | 3/2004 | Ellson et al. |
| 6,799,475 B2 | 10/2004 | Van Klooster |
| 6,983,654 B2 | 1/2006 | Balin |
| 7,093,502 B2 | 8/2006 | Kupnik et al. |
| 7,322,251 B2 | 1/2008 | Gysling et al. |
| 7,343,821 B2 | 3/2008 | Panicke et al. |
| 7,707,987 B2 | 5/2010 | Githrie |
| 8,238,509 B2 | 8/2012 | Moen et al. |
| 8,437,446 B2 | 5/2013 | Young |
| 8,642,954 B2 | 2/2014 | Ivaldi et al. |
| 8,746,440 B2 | 6/2014 | Williamson et al. |
| 8,767,905 B2 | 7/2014 | Neeley et al. |
| 8,844,347 B2 | 9/2014 | Sui et al. |
| 8,893,558 B2 | 11/2014 | Davis et al. |
| 8,968,547 B2 | 3/2015 | Loewen et al. |
| 9,008,257 B2 | 4/2015 | Hyde et al. |
| 9,074,922 B2 | 7/2015 | Dayal et al. |
| 9,150,975 B2 | 10/2015 | Berger et al. |
| 9,224,507 B2 | 12/2015 | Heinold et al. |
| 9,234,777 B2 | 1/2016 | Ao et al. |
| 9,251,920 B2 | 2/2016 | Loewen et al. |
| 9,287,099 B2 | 3/2016 | Otsuka et al. |
| 9,295,923 B2 | 3/2016 | Mezheritsky et al. |
| 9,302,226 B2 | 4/2016 | Loewen et al. |
| 9,324,465 B2 | 4/2016 | Splichal, Jr. |
| 9,347,807 B2 | 5/2016 | Ao |
| 9,368,238 B2 | 6/2016 | Theofanous et al. |
| 9,368,241 B2 | 6/2016 | Loewen et al. |
| 9,460,818 B2 | 10/2016 | Bergman |
| 9,475,706 B2 | 10/2016 | Policke et al. |
| 9,557,200 B2 | 1/2017 | Forster |
| 9,638,607 B1 | 5/2017 | Hawthorne et al. |
| 9,664,543 B2 | 5/2017 | Twerdowski et al. |
| 9,691,507 B2 | 6/2017 | Hyde et al. |
| 9,691,508 B2 | 6/2017 | Hyde et al. |
| 9,720,171 B2 | 8/2017 | Arai |
| 9,748,006 B2 | 8/2017 | Hyde et al. |
| 9,761,336 B2 | 9/2017 | Caine et al. |
| 9,761,337 B2 | 9/2017 | Hyde et al. |
| 9,799,417 B2 | 10/2017 | Hyde et al. |
| 9,833,648 B2 | 12/2017 | Loewen et al. |
| 9,875,817 B2 | 1/2018 | Edwards et al. |
| 9,875,818 B2 | 1/2018 | Nygaard et al. |
| 9,921,158 B2 | 3/2018 | Rider |
| 9,921,184 B2 | 3/2018 | Corbin et al. |
| 9,968,899 B1 | 5/2018 | Gellaboina et al. |
| 9,995,609 B2 | 6/2018 | Fernald |
| 10,041,163 B1 | 8/2018 | Offer et al. |
| 10,056,160 B2 | 8/2018 | LeBlanc |
| 10,109,382 B2 | 10/2018 | Hackett et al. |
| 10,280,527 B2 | 5/2019 | Loewen et al. |
| 10,290,381 B2 | 5/2019 | Caine et al. |
| 10,309,813 B2 | 6/2019 | Soneter |
| 10,317,262 B2 | 6/2019 | Kippersund |
| 10,354,767 B2 | 7/2019 | Goreaud et al. |
| 10,416,045 B2 | 9/2019 | Launiere et al. |
| 10,438,705 B2 | 10/2019 | Cheatham, III |
| 10,497,480 B2 | 12/2019 | Cheatham, III et al. |
| 10,515,729 B2 | 12/2019 | Horn et al. |
| 10,566,096 B2 | 2/2020 | Czerwinski |
| 10,650,934 B2 | 5/2020 | Caine et al. |
| 10,665,356 B2 | 5/2020 | Abbott |
| 10,734,122 B2 | 8/2020 | Cisneros, Jr. |
| 10,741,293 B2 | 8/2020 | Abbott |
| 10,755,822 B2 | 8/2020 | Gibbons et al. |
| 10,825,571 B2 | 11/2020 | Edwards et al. |
| 10,830,689 B2 | 11/2020 | Hedtke |
| 10,876,871 B2 | 12/2020 | Head et al. |
| 10,937,557 B2 | 3/2021 | Sineath et al. |
| 10,962,461 B2 | 3/2021 | Linneen |
| 11,031,140 B2 | 6/2021 | Hunt et al. |
| 11,043,309 B2 | 6/2021 | Nygaard et al. |
| 11,049,624 B2 | 6/2021 | Loewen et al. |
| 11,075,013 B2 | 7/2021 | Abbott et al. |
| 11,075,015 B2 | 7/2021 | Cisneros, Jr. |
| 11,145,424 B2 | 10/2021 | Abbott |
| 11,149,623 B2 | 10/2021 | Kutsch et al. |
| 11,200,991 B2 | 12/2021 | LeBlanc |
| 11,226,281 B1 | 1/2022 | Findikoglu et al. |
| 11,286,172 B2 | 3/2022 | William et al. |
| 11,342,084 B2 | 5/2022 | Cheatham, III et al. |
| 11,342,085 B2 | 5/2022 | Hinds |
| 11,367,536 B2 | 6/2022 | Abbott |
| 11,373,765 B2 | 6/2022 | Czerwinski |
| 11,373,769 B2 | 6/2022 | Hinds |
| 11,380,450 B2 | 7/2022 | Sineath et al. |
| 11,417,435 B2 | 8/2022 | Nelson |
| 11,428,564 B2 | 8/2022 | Dayal et al. |
| 11,443,859 B2 | 9/2022 | Bass |
| 11,459,662 B2 | 10/2022 | Murahara |
| 11,482,345 B2 | 10/2022 | Hunt et al. |
| 11,488,731 B2 | 11/2022 | Abbott |
| 11,569,000 B2 | 1/2023 | Hinds |
| 11,574,094 B2 | 2/2023 | Pivovar et al. |
| 11,626,213 B2 | 4/2023 | Regan et al. |
| 11,875,906 B2 | 1/2024 | LeBlanc |
| 11,961,625 B2 | 4/2024 | Clarkson |
| 11,984,231 B2 | 5/2024 | Keller |
| 12,046,380 B2 | 7/2024 | Cheatham, III |
| 12,062,461 B2 | 8/2024 | Welter |
| 12,073,951 B2 | 8/2024 | Regan |
| 2002/0122522 A1 | 9/2002 | Goto et al. |
| 2004/0093957 A1 | 5/2004 | Griffin et al. |
| 2006/0000711 A1 | 1/2006 | Lin |
| 2009/0046825 A1 | 2/2009 | Dulka et al. |
| 2012/0082911 A1 | 4/2012 | Hyde et al. |
| 2012/0082913 A1 | 4/2012 | Hyde et al. |
| 2012/0087455 A1 | 4/2012 | Hyde et al. |
| 2013/0199305 A1 | 8/2013 | Faermald |
| 2014/0123768 A1 | 5/2014 | Ao et al. |
| 2015/0040727 A1 | 2/2015 | Kosslow |
| 2015/0107371 A1 | 4/2015 | Khrakovsky |
| 2015/0310948 A1 | 10/2015 | Venneri |
| 2016/0334255 A1 | 11/2016 | Gestner |
| 2017/0271033 A1 | 9/2017 | Dodson et al. |
| 2017/0294241 A1 | 10/2017 | Dodson et al. |
| 2017/0294242 A1 | 10/2017 | Simpson et al. |
| 2017/0358374 A1 | 12/2017 | Loewen et al. |
| 2018/0254109 A1 | 9/2018 | Cheatham, III et al. |
| 2018/0321192 A1 | 11/2018 | Gardner |
| 2019/0015806 A1 | 1/2019 | Gellaboina et al. |
| 2019/0057783 A1 | 2/2019 | LeBlanc |
| 2019/0139665 A1 | 5/2019 | Czerwinski et al. |
| 2019/0172597 A1 | 6/2019 | Carvajal et al. |

(56) References Cited

U.S. PATENT DOCUMENTS

| | | |
|---|---|---|
| 2019/0371482 A1 | 12/2019 | Benson |
| 2020/0118698 A1 | 4/2020 | Czerwinski et al. |
| 2020/0161015 A1 | 5/2020 | Czerwinski et al. |
| 2021/0095645 A1 | 4/2021 | Cheatham, III |
| 2021/0276888 A1 | 9/2021 | Kraczek et al. |
| 2021/0287814 A1 | 9/2021 | Loewen et al. |
| 2021/0302295 A1 | 9/2021 | Linneen |
| 2021/0304909 A1 | 9/2021 | Gramlich et al. |
| 2021/0318673 A1 | 10/2021 | Kitchen et al. |
| 2021/0343431 A1 | 11/2021 | Cisneros, Jr. |
| 2022/0005619 A1 | 1/2022 | Cisneros, Jr. |
| 2022/0026288 A1 | 1/2022 | Liu et al. |
| 2022/0051818 A1 | 2/2022 | Cisneros, Jr. |
| 2022/0051820 A1 | 2/2022 | Corbin |
| 2022/0084702 A1 | 3/2022 | Loewen et al. |
| 2022/0310281 A1 | 9/2022 | Czerwinski |
| 2022/0390334 A1 | 12/2022 | Jorgensen |
| 2023/0104365 A1 | 4/2023 | Eichel et al. |
| 2023/0295796 A1 | 9/2023 | Kim |
| 2024/0035119 A1 | 2/2024 | Tilton |
| 2024/0062923 A1 | 2/2024 | Scherr |
| 2024/0087761 A1 | 3/2024 | Clarkson |
| 2024/0124985 A1 | 4/2024 | Tsang |
| 2024/0167919 A1 | 5/2024 | Biegalski |
| 2024/0192123 A1 | 6/2024 | Robison |
| 2024/0246023 A1 | 7/2024 | Tsang |
| 2024/0266084 A1 | 8/2024 | Moore |
| 2024/0282473 A1 | 8/2024 | Cheatham, III |
| 2024/0312654 A1 | 9/2024 | Keller |
| 2024/0355488 A1 | 10/2024 | Callaway |
| 2024/0367921 A1 | 11/2024 | Tilton |
| 2024/0384934 A1 | 11/2024 | Lineen |
| 2024/0395426 A1 | 11/2024 | Welter |

FOREIGN PATENT DOCUMENTS

| | | |
|---|---|---|
| CN | 202471625 | 10/2012 |
| CN | 203080087 | 7/2013 |
| CN | 102553664 | 12/2013 |
| CN | 102967494 | 4/2015 |
| CN | 103714371 | 5/2016 |
| CN | 106596705 | 4/2017 |
| CN | 106643924 | 5/2017 |
| CN | 107230506 | 10/2017 |
| CN | 105334138 | 1/2018 |
| CN | 109141969 | 1/2019 |
| CN | 106621429 | 4/2019 |
| CN | 106840765 | 4/2019 |
| CN | 106769450 | 5/2019 |
| CN | 106902526 | 6/2019 |
| CN | 108231224 | 12/2019 |
| CN | 107238627 | 3/2020 |
| CN | 210803355 | 6/2020 |
| CN | 108956744 | 7/2020 |
| CN | 111739664 | 10/2020 |
| CN | 111739670 | 10/2020 |
| CN | 212484947 | 2/2021 |
| CN | 108956443 | 3/2021 |
| CN | 108088813 | 6/2021 |
| CN | 112946046 | 6/2021 |
| CN | 113372886 | 9/2021 |
| CN | 113630582 | 11/2021 |
| CN | 215770541 | 2/2022 |
| CN | 111141670 | 6/2022 |
| CN | 112853100 | 7/2022 |
| CN | 114813222 | 7/2022 |
| CN | 112700895 | 8/2022 |
| CN | 114974630 | 8/2022 |
| CN | 112992389 | 11/2022 |
| CN | 115420391 | 12/2022 |
| CN | 115436402 | 12/2022 |
| CN | 115237524 | 5/2023 |
| DE | 4124692 | 1/1993 |
| EP | 2624359 | 8/2013 |
| EP | 3335187 | 12/2023 |
| EP | 3335221 | 1/2024 |
| EP | 4100972 | 1/2024 |
| EP | 4326915 | 2/2024 |
| EP | 4288978 | 10/2024 |
| GB | 829958 | 3/1960 |
| JP | 2000-171386 | 6/2000 |
| JP | 2001033580 | 2/2001 |
| JP | 2010185785 | 8/2010 |
| NO | 321656 | 6/2006 |
| WO | WO1992000507 | 1/1992 |
| WO | WO2015017928 | 2/2015 |
| WO | WO 2015096901 | 7/2015 |
| WO | WO 2017032379 | 3/2017 |
| WO | WO 2017059360 | 4/2017 |
| WO | WO 2018009433 | 1/2018 |
| WO | WO 2017199059 | 2/2018 |
| WO | WO 2018026536 | 2/2018 |
| WO | WO 2018027170 | 2/2018 |
| WO | WO 2018064572 | 4/2018 |
| WO | WO 2018213669 | 11/2018 |

OTHER PUBLICATIONS

Head, "A molten salt test loop for component and instrumentation testing", Annals of Nuclear Energy, Jun. 15, 2023; 186: 109772. (Year: 2023).*

U.S. Appl. No. 18/795,873, Kelly et al., filed Aug. 6, 2024.

Harkema et al. Development and Demonstration of a Prototype Molten Salt Sampling System. Idaho National Laboratory [online]. Jan. 2023.

Hoffman, "Fudamentals of Ultrasonic-Flow Measurements for Industrial Applications," Krohne Mess-technik GmbH & Co. KG Duisburg, 2000, 31 pages.

A sampling device for molten-salt systems' (McDonald et al.), Mar. 7, 1960 (Mar. 7, 1960). [online, re-trieved from <URL:https://www.ostl.gov/serv!ets/purl/4187309>.

Operation of the Sampler Enricher in the Molten Salt Reactor Experiment' {Gallaher}, Oct. 2, 1971 (Oct. 2, 1971), (online], retrieved from.

Blain R. Lancaster, High Resolution Distributed Temperature Measurements Using Optical Fibers in a Molten Salt Forced Convection Environment, Texas A&M University, pp. 1-53 (Year: 2021).

Thurgood, "COBRA/TRAC—A Thermal-Hydraulics Code for Transient Analysis of Nuclear Reactor Vessels and Primary Coolant Systems," Mar. 1983.

RELAP5—3D, https://inl.gov/relap53d/.

System Analysis Module (SAM), https://www.anl.gov/nse/system-analysis-module.

Kile et al. "Assessment of SCALE and MELCOR for a generic pebble bed fluoride high-temperature reactor," Annals of Nuclear Energy vol. 173, Aug. 2022, 109107.

B. Chanaron, C. Ahnert, Nicolas Crouzet, Victor Sanchez, Nikola Kolev, et al.. Advanced Multiphysics Simulation for Reactor Safety in the framework of the NURESAFE Project. Annals of Nuclear Energy, 2015, 84, pp. 166-177.ff10.1016/j.anucene.2014.12.013ff. ffcea-02386823f.

Lee et al. "Multi-physics simulation of nuclear reactor core by coupled simulation using CUPID/MASTER," International Journal of Heat and Mass Transfer vol. 115, Part A, Dec. 2017, pp. 1020-1032.

* cited by examiner $$\begin{bmatrix} h_e \\ h_s \\ h_d \end{bmatrix} = \frac{1}{\gamma(A_e + A_d + A_s)} \begin{bmatrix} -A_d - A_s & A_s & A_d \\ A_e & -A_e - A_d & A_d \\ A_e & A_s & -A_e - A_s \end{bmatrix} \times \begin{bmatrix} P_e \\ P_s \\ P_d \end{bmatrix}$$

$$+ \frac{1}{(A_e + A_d + A_s)} \begin{bmatrix} -A_d h_{de} - A_s h_{de} + A_s h_{ds} + V_t - V_p \\ A_e h_{de} - A_e h_{ds} - A_d h_{ds} + V_t - V_p \\ A_e h_{de} + A_s h_{ds} + V_t - V_p \end{bmatrix}$$

FLUID LEVEL CONTROL SYSTEM FOR A MOLTEN FUEL SALT SAMPLING TANK IN A NUCLEAR REACTOR SYSTEM

RELATED APPLICATION

The present application relates and claims priority to U.S. Provisional Application No. 63/512,973, filed on Jul. 11, 2023, which is hereby incorporated by reference in its entirety.

TECHNICAL FIELD

The described examples relate generally to systems, devices, and techniques for controlling vessel fluid level in a nuclear reactor system, and in particular, to controlling the fluid level of an experimental tank in a molten salt reactor.

BACKGROUND

Molten salt reactors (MSRs) offer an approach to nuclear power that utilizes molten salts as their nuclear fuel in place of the conventional solid fuels used in light water reactors. Advantages include efficient fuel utilization and enhanced safety (largely due to replacing water as a coolant with molten salt). In an MSR, fission reactions occur within a molten salt composition housed within a reactor vessel. Under certain circumstances, it is necessary to check the nuclear fuel for experimental purposes, such as materials testing, filtration, and metrology. In many conventional designs, it is not easy to access the nuclear fuel and/or other fluids of the MSR without shutting down the reactors. As such, there remains a need for developing a fluid level control system for an MSR in which the MSR can effectively maintain a fluid level in an experimental tank (which may also be viewed as a sample tank and/or other tanks or vessels of a nuclear reactor system.

SUMMARY

In one example, a method for controlling a fluid level of an experimental tank is disclosed. The method includes determining an initial pressure of a headspace of an experimental tank using a first pressure transducer, the experimental tank having a fluid contained therein occupying an experimental tank initial height. The method further includes determining an initial pressure of a headspace of a sump tank using a second pressure transducer. The sump tank has fluid contained therein that occupies a sump tank initial height. The sump tank is elevationally below the experimental tank. The headspace of the sump tank and the fluid of the sump tank are each fluidically coupled with the experimental tank to define a fluid control circuit therebetween. The method further includes determining an initial pressure of a headspace of a drain tank using a third pressure transducer The drain tank has fluid contained therein that occupies a drain tank initial height. The drain tank is elevationally below the sump tank. The fluid of the drain tank is fluidically coupled with the fluid control circuit.

The method further includes determining one or more of: (i) the experimental tank initial height being different from an experimental tank target height for the fluid, (ii) the sump tank initial height being different from a sump tank target height for the fluid, or (iii) the drain tank initial height being different from a drank tank target height of the fluid. The method further includes calculating a set pressure of each of the headspaces of the experimental tank, the sump tank, and the drain tank based on the experimental tank target height, the sump tank target height, and the drain tank target height. The method, in turn, includes causing the headspaces of the experimental tank, the sump tank, and the drain tank to transition to the calculated set pressures and causing the fluid to circulate through the fluid circuit and among the experimental tank, the sump tank, and the drain tank to establish the fluid: (i) at the experimental target height for the experimental tank, (ii) at the sump tank target height for the sump tank, and (iii) at the drain tank target height for the drain tank.

In another example, the method may include operating an inert gas system configured to deliver and to receive an inert gas from each of the headspace of the experimental tank, the headspace of the sump tank, and the headspace of the drain tank.

In another example, the inert gas system may include a first electronic proportional regulator associated with an experimental inert gas circuit with the experimental tank, a second electronic proportional regulator associated with a sump inert gas circuit with the sump tank, and a third electronic proportional regulator associated a drain inert gas circuit with the drain tank. In this regard, the method may further include invoking each of the first electronic proportional regulator, the second electronic proportional regulator, and the third electronic proportional regulator in order to cause said transition to the calculated set pressures.

In another example, the method may include determining the experimental tank initial height using a first level sensor, determining the sump tank initial height using a second level sensor, and determining the drain tank initial height using a third level sensor.

In another example, the method may include determining the experimental tank actual height using the first level sensor, determining the sump tank actual height using the second level sensor, and determining the drain tank actual height using the third level sensor.

In another example, the method may include iteratively invoking each of the first electronic proportional regulator, the second electronic proportional regulator, and the third electronic proportional regulator in order to cause said transitioning to the calculated set pressures based on a difference between the determined experimental tank actual height, sump tank actual height, and the drain tank actual height and the corresponding experimental tank target height, sump tank target height, or drain tank target height.

In another example, the method may include ceasing the invoking of each of the first electronic proportional regulator, the second electronic proportional regulator, and the third electronic proportional regulator when the difference between the determined experimental tank actual height, sump tank actual height and the drain tank actual height and the corresponding experimental tank target height, sump tank target height, or drain tank target height is within a predefined tolerance. The predefined tolerance is less than or equal to one half inch of fluid height difference between the determined experimental tank actual height and the experimental tank target height.

In another example, the method may further include operating a pump that is at least partially submerged in the fluid of the sump tank.

In another example, the method may use molten salt as the fluid.

In another example, a system for controlling a fluid level of an experimental tank is disclosed. The system includes an experimental tank associated with a first pressure transducer and that has a fluid contained therein occupying an experiential vessel initial height. The system further includes a sump tank associated with a second pressure transducer and that has the fluid contained therein occupying a sump tank initial height. The sump tank is elevationally below the experimental tank. The headspace of the sump tank and the fluid of the sump tank are each fluidically coupled with the experimental tank to define a fluid control circuit therebetween. The system further includes a drain tank associated with a third pressure transducer and that has the fluid contained therein occupying a drain tank initial height. The drain tank is elevationally below the sump tank and the fluid of the drain tank is fluidically coupled with the fluid control circuit. The system further includes an inert gas system configured to deliver and to receive an inert gas from each of the headspace of the experimental tank, the headspace of the sump tank, and the headspace of the drain tank. The system further includes a control module operatively coupled with each of the first pressure transducer, the second pressure transducer, and the third pressure transducer and the inert gas system.

The control module of the disclosed system is configured to calculate a set pressure of each of the headspaces of the experimental tank, the sump tank, and the drain tank based on the experimental tank target height, the sump tank target height, and the drain tank target height. In turn, the control module is configured to cause the headspaces of the experimental tank, the sump tank, and the drain tank to transition to the calculated set pressures. The control module is further configured to cause the fluid to circulate through the fluid circuit and among the experimental tank, the sump tank, and the drain tank to establish the fluid at the experimental target height for the experimental tank, at the sump tank target height for the sump tank, and at the drain tank target height for the drain tank.

In another example, the inert gas system may include a first electronic proportional regulator associated with an experimental inert gas circuit with the experimental tank, a second electronic proportional regulator associated with a sump inert gas circuit with the sump tank, and a third electronic proportional regulator associated a drain inert gas circuit with the drain tank. Accordingly, the control module may be configured to invoke each of the first electronic proportional regulator, the second electronic proportional regulator, and the third electronic proportional regulator in order to cause said transition to the calculated set pressures.

In another example, the system may include a first level sensor associated with the experimental tank, a second level sensor associated with the sump tank, and a third level sensor associated with the drain tank. In this regard, the control module may be configured to determine the experimental tank initial height and an experimental tank actual height using the first level sensor, the sump tank initial height and a sump tank actual height using the second level sensor, and the drain tank initial height and a drain tank actual height using the third level sensor. The experimental tank actual height, the sump tank actual height, and the drain tank actual height may be responsive to the invoking by the control module.

In another example, control module may be further configured to iteratively invoke each of the first electronic proportional regulator, the second electronic proportional regulator, and the third electronic proportional regulator in order to cause said transition to the calculated set pressures based on a difference between the determined experimental tank actual height, sump tank actual height, and the drain tank actual height and the corresponding experimental tank target height, sump tank target height, or drain tank target height.

In another example, the system may include a pump that is at least partially submerged in the fluid of the sump tank and configured to cause the circulation of the fluid through the fluid circuit.

In another example, the fluid in the system may include a molten salt.

In another example, a molten salt reactor system is disclosed. The reactor system includes a reactor vessel having a molten salt circulating therethrough. The reactor vessel may be configured to heat the molten salt by fission reactions. The reactor system may further include a system for controlling a fluid level of an experimental tank, such as any of the experimental tanks described herein. The experimental tank is fluidically coupled with the reactor vessel.

In another example, the experimental tank may define a reactor access vessel. The reactor access vessel may extend from a headspace of the reactor vessel.

In another example, the molten salt reactor system may further include a reactor pump, a heat exchanger, and a drain that may be each arranged fluidically along a molten salt loop with the reactor vessel and may be configured for the circulation of the molten salt therealong. The experimental tank may be positioned along and fluidically coupled to the molten salt loop.

In another example, the experimental tank may define one vessel of a molten salt test system.

In addition to the example aspects described above, further aspects and examples will become apparent by reference to the drawings and by study of the following description.

BRIEF DESCRIPTION OF THE DRAWINGS

FIG. 4 depicts a mathematical model to determine target fluid levels of an experimental tank, a sump tank, and a drain tank.

Figure 1:
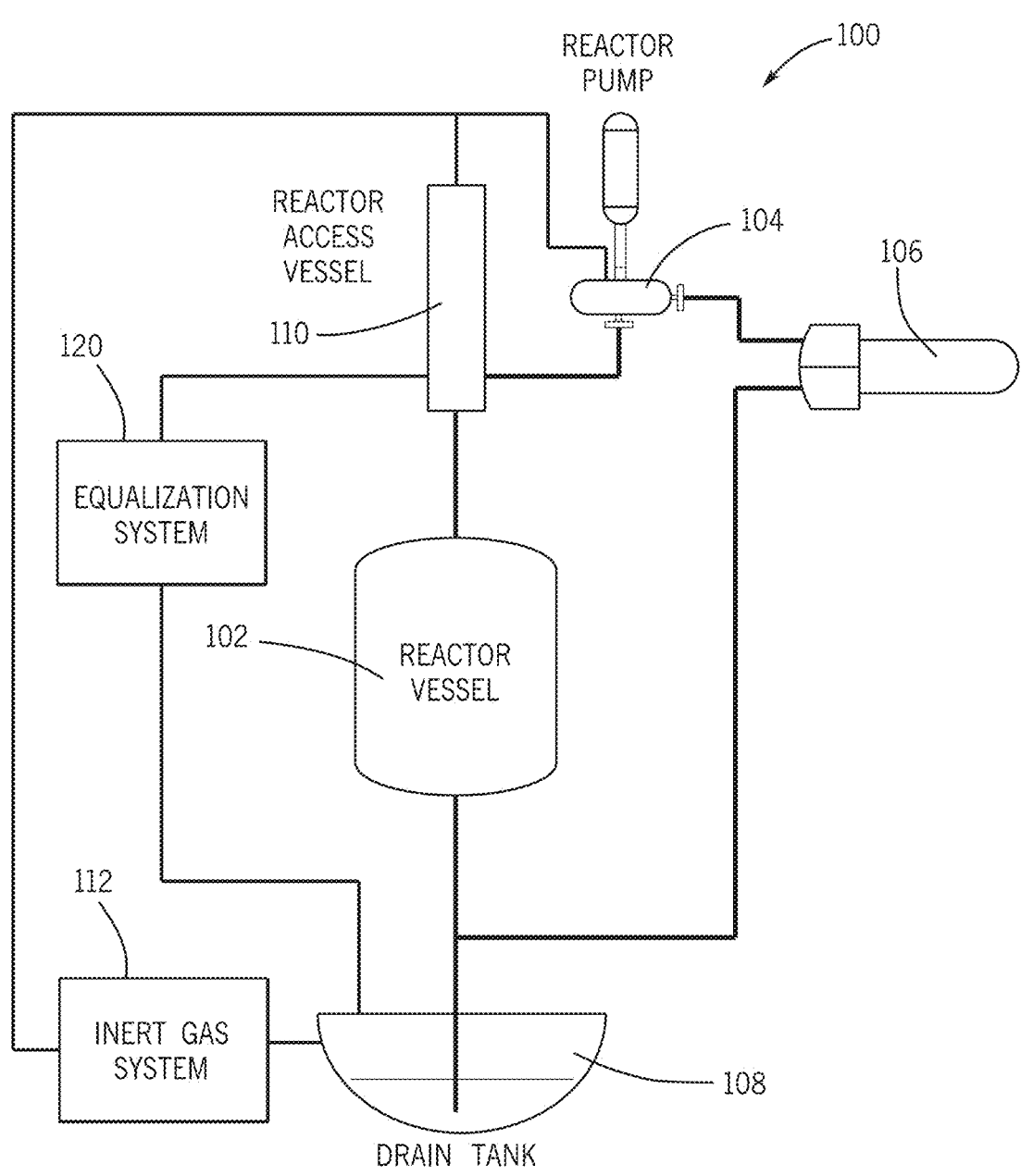
FIG. 1 depicts an example molten salt reactor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to molten salt reactor systems that are operable to control fluid levels of an experimental tank for experimental purposes, such as materials testing, filtration, and metrology. A molten salt system may broadly include a collection of components configured to circulate a molten fuel salt along a fuel salt loop. For example, a molten salt reactor system may operate by circulating a molten fuel salt between a reactor vessel (within which fission occurs) and a heat exchanger (for the removal of heat from the fuel salt). Under certain circumstances, it may be necessary to remove the molten fuel salt from the fuel salt loop and check the fuel salt for experimental purposes.

Turning to the drawings, for purposes of illustration, FIG. 1A depicts a schematic representation of an example molten salt reactor system 100. In various embodiments, a molten salt reactor system 100 utilizes fuel salt enriched with uranium (e.g., high-assay low-enriched uranium) to create thermal power via nuclear fission reactions. In at least one embodiment, the composition of the fuel salt may be LiF—BeF2-UF4, though other compositions of fuel salts may be utilized as fuel salts within the reactor system 100. The fuel salt within the system 100 is heated to high temperatures (about 700° C.) and melts as the system 100 is heated. In several embodiments, the molten salt reactor system 100 includes a reactor vessel 102 where the nuclear reactions occur within the molten fuel salt, a fuel salt pump 104 that pumps the molten fuel salt to a heat exchanger 106, such that the molten fuel salt re-enters the reactor vessel after flowing through the heat exchanger, and piping in between each component. The molten salt reactor system 100 may also include additional components, such as, but not limited to, drain tank 108 and reactor access vessel 110. The drain tank 108 may be configured to store the fuel salt once the fuel salt is in the reactor system 100 but in a subcritical state, and also acts as storage for the fuel salt if power is lost in the system 100. The reactor access vessel may be configured to allow for introduction of small pellets of uranium fluoride (UF4) to the system 100 as necessary to bring the reactor to a critical state and compensate for depletion of fissile material.

In several examples, the molten salt reactor system 100 may include an inert gas system 112 to provide inert gas to a head space of the drain tank 108, among other functions. The inert gas system 112 may further relieve inert gas from the head space of the drain tank 108 as needed. The inert gas system 112 is therefore operable to maintain pressurized inert gas in the head space of the drain tank 108 that is sufficient to substantially prevent the flow of molten fuel salt into the drain tank during normal operations. For example, with the head space of the drain tank 108 pressurized by the inert gas system 112, molten salt may generally circulate between the reactor vessel 102 and the heat exchanger 106 without substantially draining into the drain tank 108. In some cases, the inert gas system 112 may be configured to supply inert gas to the head space of various other components of the molten salt reactor system 100, such as to the head space of the reactor access vessel 110, to the seal of reactor pump 104, among other components. Upon the occurrence of a shutdown event, the inert gas system 112 may cease providing inert gas to the head space of the drain tank 108, and other components to which the system 112 supplies inert gas.

The molten salt reactor system 100 may further include an equalization system 120 that is operable to equalize the pressure between the head space of the drain tank 108 and the reactor vessel 102 upon the occurrence of a shutdown event. For example, during normal operation a pressure differential exists between the head space of the drain tank 108 and the reactor vessel 102. Such pressure differential prevents or impedes the draining of the fuel salt into the drain tank 108. In this regard, the equalization system 120 may be operable to fluidically couple (via opening one or more valves) the head space of the drain tank 108 and the reactor vessel 102 to reduce or eliminate the pressure differential, thereby allowing the fuel salt to readily flow into the drain tank upon the shutdown event.

It will be appreciated that the methods for controlling a fluid level in an experimental tank may be used to control a fluid level in one or more tanks or vessels described above in relation to the molten salt reactor system 100. In one example, the methods described herein may be used to control a fluid level in the reactor access vessel 110 and/or other in various molten salt test systems (MSTS). In other cases, the methods described herein may be configured to control a fluid level in other vessels or tanks of the molten salt reactor system 100 and/or of other nuclear reactor systems. In this regard, the molten salt reactor system 100 is presented for purposes of illustration, and the example methods described herein have wide applicability for use in controlling fluid levels in various vessels and tanks of a molten salt reactor system or other fluid systems.

Figure 2:
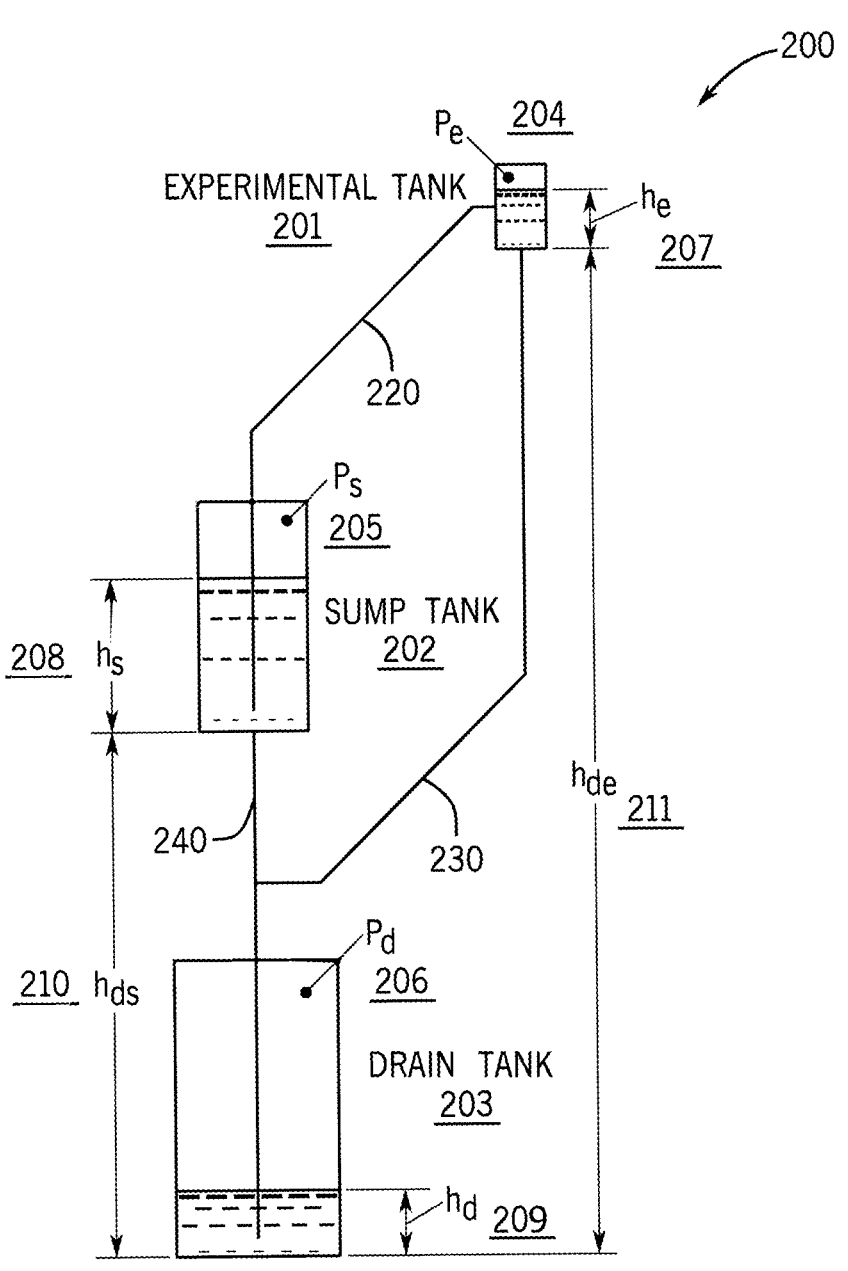
FIG. 2 depicts a fluid level control system including an experimental tank, a sump tank, and a drain tank.

FIG. 2 illustrates an exemplary fluid level control system 200, which may be used in the molten salt reactor system 100 illustrated in FIG. 1. For example, the fluid level control system 200 may be used to control a fluid level in one or more tanks or vessels of the reactor system 100, including the experimental vessel 110 and/or a vessel or tank of the MSTS. The fluid level control system 200 includes three tanks: an experimental tank 201, a sump tank 202, and a drain tank 203. The experimental tank 201 contains a fluid with a height of $h_e$ 207 and a cover gas pressure in its headspace $P_e$ 204. The sump tank 202 contains a fluid with a height of $h_s$ 208 and a cover gas pressure in its headspace $P_s$ 205. As shown in FIG. 2, the sump tank 202 is positioned elevationally below the experimental tank 201 and elevationally above the drain tank 203. The height between the bottom of the sump tank 202 and the bottom of the drain tank 203 is $h_{ds}$ 210. The height between the bottom of the experimental tank 201 and the bottom of the drain tank 203 is $h_{de}$ 211. Specifically, the sump tank 202 is fluidically coupled with the experimental tank 201 through pipes 220, 230, 240 to form a fluid control circuit. The drain tank 203 contains a fluid with a height of $h_d$ 209 and a cover gas pressure in its headspace $P_d$ 206. The drain tank 203 is fluidically coupled with the experimental tank 201 and the sump tank 202 through the pipes 230, 240 so that the fluid of the drain tank 203 can be circulated among the three tanks 201, 202, 203.

Figure 3:
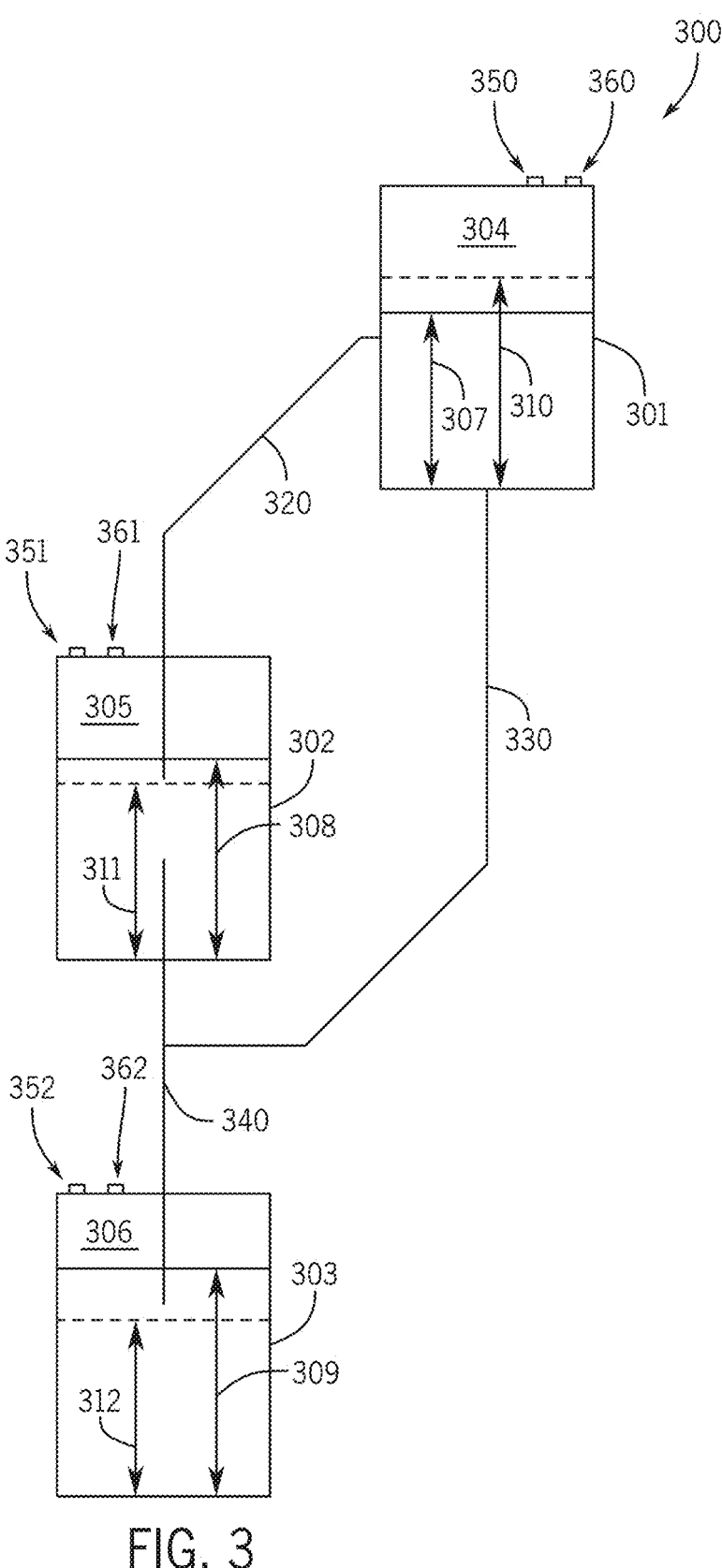
FIG. 3 depicts another fluid level control system including an experimental tank, a sump tank, and a drain tank, with initial and target fluid levels.
Figure 9:
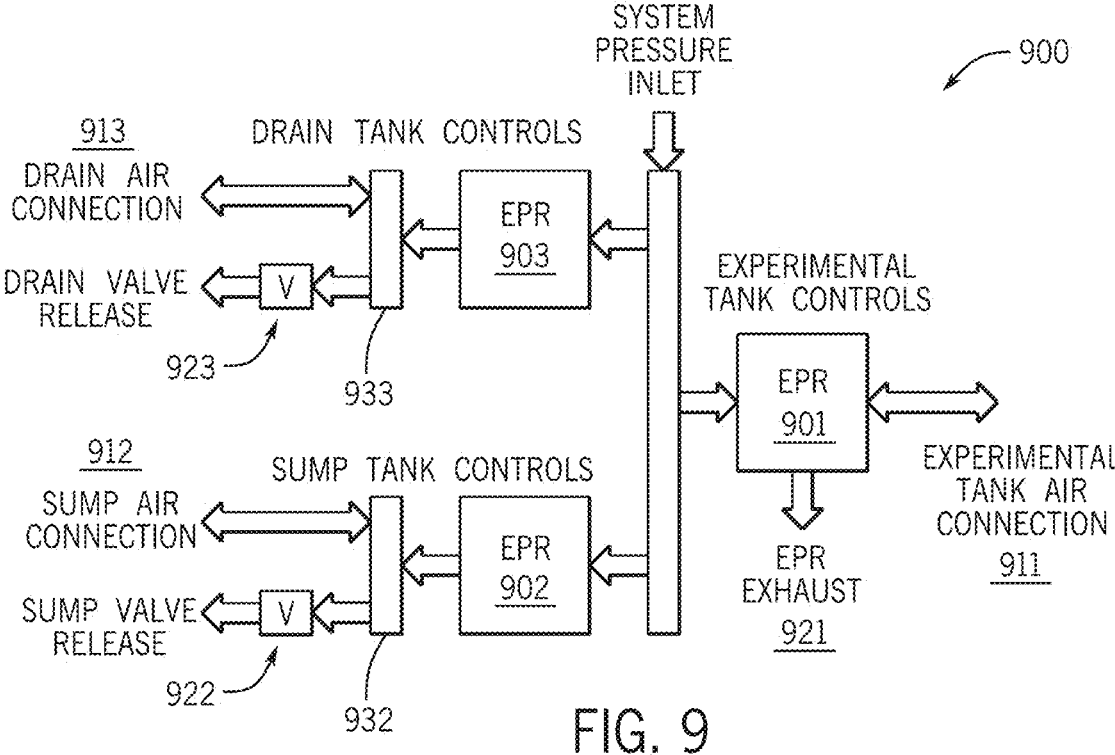
FIG. 9 depicts an example hardware diagram for cover gas pressure control in a fluid level control system.

Turning to FIG. 3, in operation, a fluid level control system 300 is shown. The fluid level control system 300 may be substantially analogous to the fluid level control system 200 shown in FIG. 2 and include an experimental tank 301, a sump tank 302, a drain tank 303, pipes 320, 330, 340, and cover gas pressures 307, 308, 309; redundant explanation of which is omitted herein for clarity. The system 300 of FIG. 3 first determines initial fluid levels 307, 308, 309 and initial cover gas pressures 304, 305, 306. As further illustrated in FIG. 3, level sensors 350, 351, 352 mounted on tanks 301, 302, 303 are configured to measure the respective fluid height in each tank. The measured heights are transmitted to a computer or other control module as the initial fluid level data 307, 308, 309. In addition, pressure transducers 360, 361, 362 mounted on the tanks 301, 302, 303 are configured to measure the respective cover gas pressure in each tank. The measured cover gas pressures are transmitted to the computer or control module as the initial cover gas pressure data 304, 305, 306. The computer or control module then calculates a target height setpoint 310, 311, 312 for the fluid in each tank based on the initial, respective, cover gas pressures 304, 305, 306. The target height setpoint 310, 311, 312 for the fluid in each tank is transmitted as a pressure control signals to each electronic pressure regulator (EPR) associated with the tank, as described in greater detail below (FIG. 9). The EPR in each tank is invoked by the pressure control signal to calibrate the cover gas pressure of the tank, resulting in achieving the target height setpoint 310, 311, 312 for the fluid in each tank. When the fluid level in each tank achieves the target height setpoint 310, 311, 312 or approaches the target height setpoint 310, 311, 312 within a predetermined tolerance, the EPR in each tank is configured to hold the current cover gas pressure to maintain the actual fluid level.

In particular, the target heights for the fluid in the tanks are determined, in part, by using Bernoulli's equation. As illustrated in FIGS. 2 and 3, the static fluids between the experimental tank and the drain tank can be expressed as:

$$P_e + \gamma h_e + \gamma h_{de} = P_d + \gamma h_d. \tag{1}$$

Similarly, the static fluids between the experimental tank and the sump tank can be expressed as:

$$P_e + \gamma h_e + \gamma h_{de} = P_s + \gamma h_s + \gamma h_{ds}. \tag{2}$$

Here, $P_e$ is the cover gas pressure in the experimental tank; $P_s$ is the cover gas pressure in the sump tank; $P_d$ is the cover gas pressure in the drain tank; $h_e$ is the fluid level in the experimental tank; $h_s$ is the fluid level in the sump tank; $h_d$ is the fluid level in the drain tank; $h_{de}$ is the height between the bottom of the drain tank and the bottom of the experimental tank; $h_{ds}$ is the height between the bottom of the drain tank and the bottom of the sump tank; and $\gamma$ is the specific weight factor of the fluid.

Assuming that the fluid is not compressible, the total volume of the fluid will not change. Equation (3) states that the total volume of the fluid in the entire system is equal to the volume of fluid in each tank plus the volume in the pipes:

$$V_d + V_s + V_e + V_p = V_t. \tag{3}$$

Here, $V_d$ is the volume of fluid in the drain tank; $V_s$ is the volume of fluid in the sump tank; $V_e$ is the volume of fluid in the experimental tank; $V_p$ is the volume of fluid in pipes connecting all the tanks; and $V_t$ is the total volume of fluid for the system. The volume of fluid in each of the tanks is computed by the product of the cross-sectional area of the tank and the fluid level of the tank. The equation (3) may be expressed in terms of fluid level:

$$A_d h_d + A_s h_s + A_e h_e + V_p = V_t. \tag{4}$$

Here, $A_d$ is the cross-sectional area of the drain tank; $A_s$ is the cross-sectional area of the sump tank; and $A_e$ is the cross-sectional area of the experimental tank. Equations (1), (2), and (4) form a set of linear equations that can compute the cover gas pressure differences and the total volume of fluid needed to achieve a set of tank fluid levels. The set of linear equations represented with matrices:

$$\begin{bmatrix} P_d - P_e \\ P_s - P_e \\ V_t \end{bmatrix} = \begin{bmatrix} \gamma & 0 & -\gamma \\ \gamma & -\gamma & 0 \\ A_e & A_s & A_d \end{bmatrix} \times \begin{bmatrix} h_e \\ h_s \\ h_d \end{bmatrix} + \begin{bmatrix} \gamma h_{de} \\ \gamma h_{de} - \gamma h_{ds} \\ V_p \end{bmatrix}. \tag{5}$$

The equations (1), (2), and (4) can be algebraically rearranged to compute the target heights given the cover gas pressures in the tanks and the total fluid volume in the system. We can derive the closed form equations for computing the target pressure in each tank when given all the fluid levels:

$$h_s = \frac{1}{A_e + A_d + A_s} \left( \frac{A_e}{\gamma} P_e - \frac{A_e + A_d}{\gamma} P_s + \frac{A_d}{\gamma} P_d + V_t + A_e h_{de} - A_e h_{ds} - A_d h_{ds} - V_p \right). \tag{6}$$

$$h_e = \frac{1}{A_e + A_d + A_s} \left( \frac{A_s}{\gamma} P_s - \frac{A_s + A_d}{\gamma} P_e + \frac{A_d}{\gamma} P_d + V_t + A_s h_{ds} - A_d h_{de} - A_s h_{de} - V_p \right). \tag{7}$$

$$h_d = \frac{1}{A_e + A_d + A_s} \left( \frac{A_e}{\gamma} P_e + \frac{A_s}{\gamma} P_s - \frac{A_e + A_s}{\gamma} P_d + V_t + A_e h_{de} + A_s h_{ds} - V_p \right). \tag{8}$$

The equations (6)-(8) can be consolidated and expressed in a matrix 400, as illustrated in FIG. 4.

Figure 5:
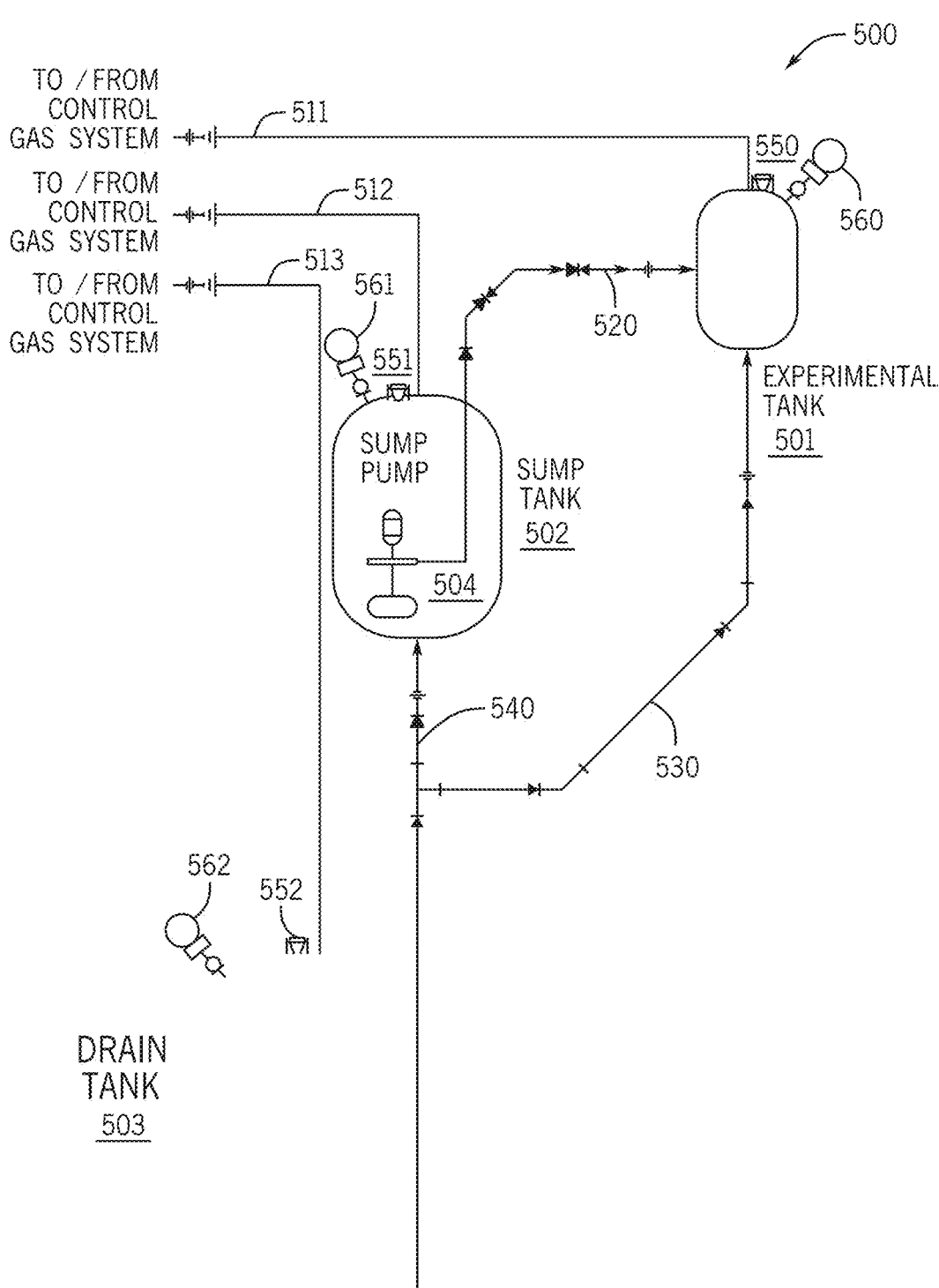
FIG. 5 depicts an example hydraulic schematic diagram of a fluid level control system.

FIG. 5 illustrates a hydraulic schematic drawing for an exemplary fluid level control system 500. For example, the hydraulic schematic may be representative of or associated with the fluid level control systems 200, 300 of FIGS. 2 and 3, respectively. The system includes an experimental tank 501, a sump tank 502, and a drain tank 503. Each tank is coupled with a gas pressure control circuit 511, 512, 513 controlled by an EPR. In one embodiment, the cover gas pressure in the headspace of each tank is controlled by a Kelly Pneumatics™ LFR-1524-420010-R4 Low Flow Electronic Proportional Regulator, which regulates its higher supply inlet port pressure down to 0 to 15 PSI with at most 0.15 PSI error within 250 ms, but is limited to gas flow rates below 6 slpm. Large changes in pressure may take longer time to regulate due to the low gas flow rate. The Kelly Pneumatics™ LFR-1524-420010-R4 Low Flow EPR has an inlet port to increase the cover gas pressure and an outlet port to decrease the cover gas pressure. In other examples, other EPR's may be used in order to perform the various functions described herein. In operation, the EPR transmits the pressure control command as a 4 to 20 mA signal, where 0 PSI corresponds to 4 mA. The fluid level and cover gas pressure of each tank are continuously monitored and measured by a level sensor 550, 551, 552 and a pressure transducer 560, 562, 562.

As illustrated in FIG. 5, level sensors 550, 551, 552 and pressure transducers 560, 561, 562 are mounted at the top of the experimental tank 501, sump tank 502, and drain tank 503. In one embodiment, the level sensor 550, 551, 552 can be an Omega™ LVCN414-I-B ultrasonic level sensor that measures distance between 0 and 4 feet with ⅛ inch accuracy. The fluid level signal is transmitted as a 4 to 20 mA signal, where 4 mA corresponds to an empty tank and 20 mA corresponds to a full tank. The level sensor 550, 551, 552 can be attached to each tank using a riser tube. For a 2" diameter riser, the riser can be no longer than 3". The pressure transducers 560, 561, 562 can be an Omega™ PX119-150AI Pressure Transmitter. Such transducer measures the pressure in range between 0 to 150 PSI with a 0.5% BFSL accuracy and transmits it as a 4 to 20 mA signal, where 0 PSI corresponds to 4 mA. In other examples, other level sensors and pressure transmits may be used in order to perform the various functions described herein Further, in the sump tank 502, a sump pump 504 is at least partially submerged in the fluid of the sump tank 502 and is configured to circulate fluid between the sump tank 502 and the experimental tank 503 via the pipes 520, 530, and 540.

Figure 6:
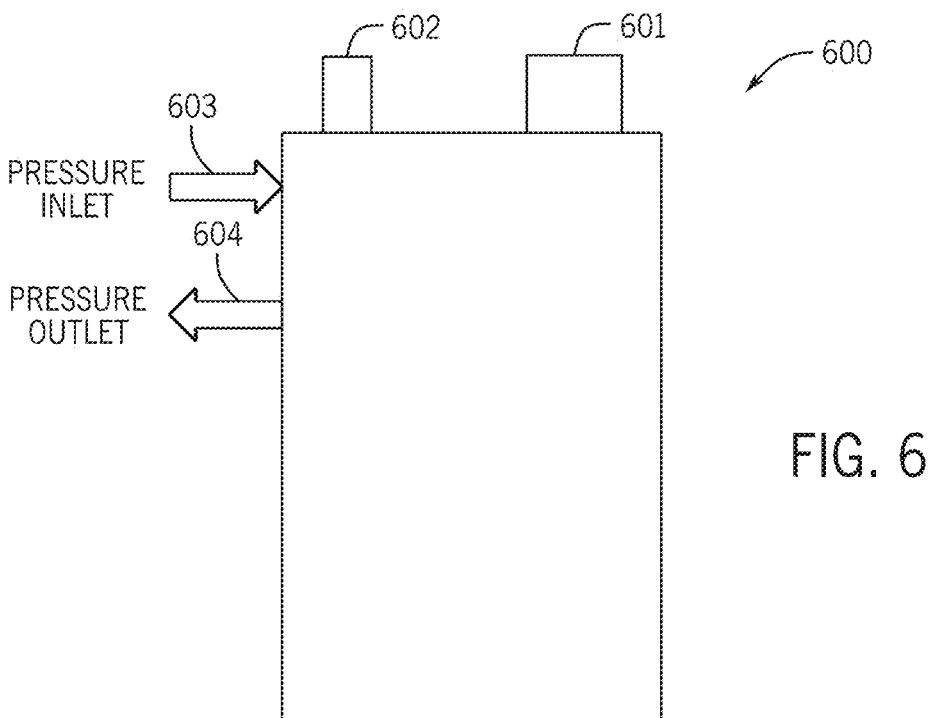
FIG. 6 depicts an example tank of a fluid level control system.

FIG. 6 illustrates an example tank 600 of a fluid level control system, as discussed in FIG. 5. Similar to FIG. 5, a level sensor 601 and a pressure transducer 602 are mounted at the top of the tank 600. An EPR is configured to calibrate the cover gas pressure of the tank 600 through a pressure inlet port 603 and a pressure outlet port 604.

Figure 7:
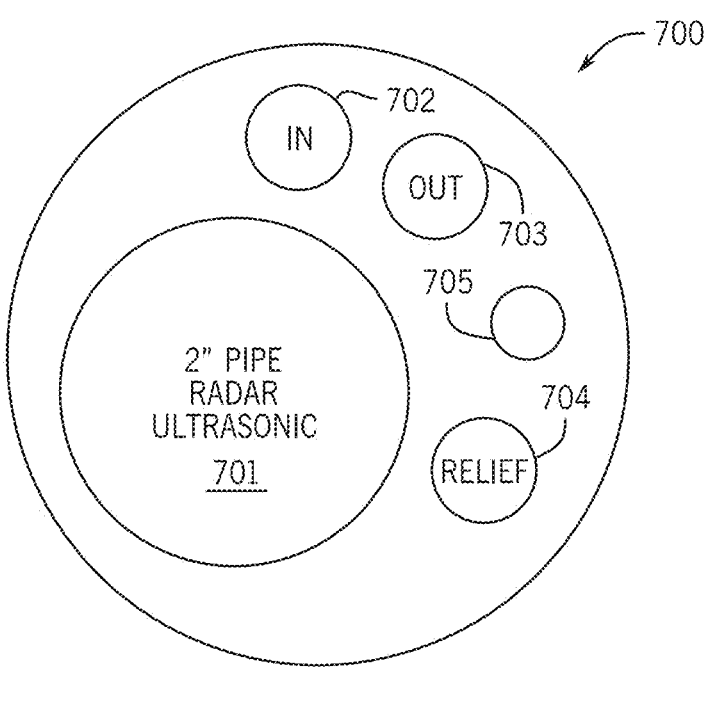
FIG. 7 depicts an example design for a tank lid flange.

With reference to FIG. 7, a diagram is depicted corresponding to a lid of a flange configured for any of the tanks described herein such as a tank 700 shown in FIG. 7 In one embodiment, a 2" hole 701 is drilled to mount a level sensor. The hole 701 is positioned to support the mounting of the level sensor at the top of the tank 700 and in the middle of the lid to measure the fluid level. Any pressure transducers mounted at top of the tank 700 and should not contact the fluids in the tank. Accordingly, three smaller holes may be drilled for the cover gas at the lid—an inlet 702, an outlet 703, and a relief valve 704. To adjust the cover gas pressure in the headspace of the tank 700, an EPR is configured to add gas from the inlet 702 to increase the pressure and release gas from the outlet 703 to reduce the pressure or vent the gas through relief valve 704. In some examples, a single gas port is drilled for gas exchange and T fittings is used to split the single gas port. In an alternative embodiment, another smaller hole 705 is drilled for testing a thermocouple ladder that is configured to measure fluid level.

Figure 8:
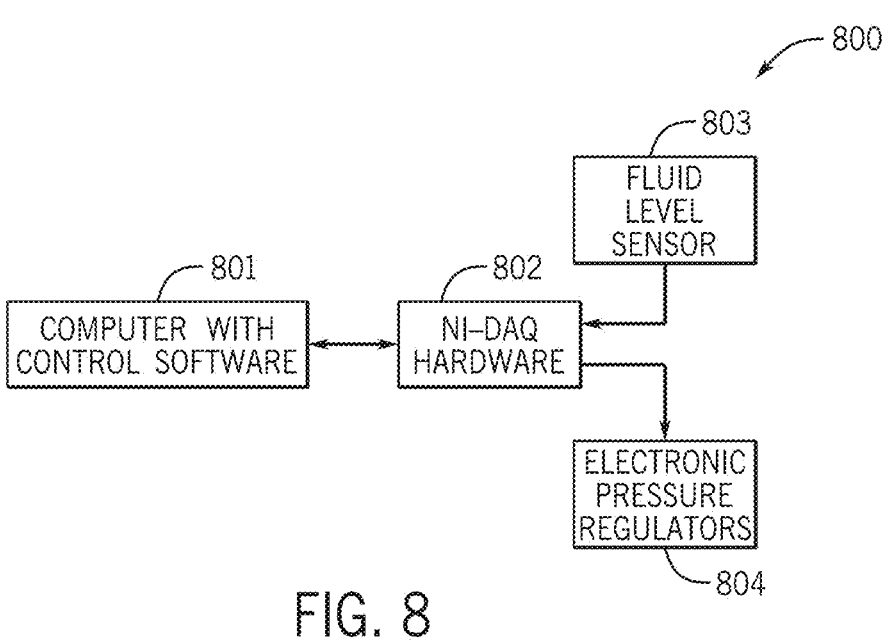
FIG. 8 depicts an example fluid level control system block diagram.

FIG. 8 illustrates an example fluid level control system 800 in a molten salt reactor system. In one embodiment, the fluid level control system 800 includes a computer 801, a data acquisition module 802, a plurality of fluid level sensors 803, and a plurality of electronic pressure regulators (EPRs) 804. In one embodiment, data acquisition module 802 includes a NI-DAQ hardware, such as a NI Compact DAQ system. The NI Compact DAQ system uses an NI 9203 Current Input Module to measure signals from the plurality of fluid level sensors 803 and a plurality of pressure transducers. The NI Compact DAQ system uses an NI 9203 Current Output Module to generate a plurality of 4 to 20 mA signals to the plurality of EPRs 804 so that the EPRs 804 can adjust the cover gas pressures in the respective tanks. The NI Compact DAQ system further uses an NI 9263 Analog Voltage Output Module to control the gate to source voltage on MOFSET transistors, which in turn controls a plurality of relief valves in the system 800.

In operation, the plurality of fluid level sensors 803 measure the initial fluid levels of the tanks in the molten salt reactor system and transmit the measured height information to the data acquisition module 802. The plurality of pressure transducers may also measure the initial cover gas pressures in the headspace of the tanks and transmit them to the data acquisition module 802. The data acquisition module 802, in turn, may forward the measured initial fluid levels and cover gas pressure levels to the computer 801. The computer 801 includes a control software or control module that may be configured to calculate a target fluid height setpoint for each of the tanks based on the received initial fluid levels and cover gas pressures.

As discussed in FIG. 4, the control software may use various derivations of Bernoulli's equations, where the inputs of the linear equations include the initial cover gas pressure of the experimental tank, the initial cover gas pressure of the sump tank, the initial cover gas pressure of the drain tank, vertical height between the bottom of the drain tank and the bottom of the experimental tank, vertical height between the bottom of the drain tank and the bottom of the sump tank, cross-sectional area of the experimental tank, cross-sectional area of the sump tank, cross-sectional area of the drain tank, total fluid volume in the system, fluid volume in the pipes connecting all of the tanks in the system, and weight factor of the fluid in the system. For example, the weight factor of water is set to $$62.4 \ \frac{lb}{ft^2} \ or \ 0.0361 \ \frac{psi}{in}.$$

The outputs of the linear equations are the target fluid height setpoints in the experimental tank, sump tank, and drain tank, respectively. The control software is further configured to convert the target fluid height setpoints into pressure control signals and to send them to the plurality of EPRs 804 through the data acquisition module 802. The pressure control signals invoke the EPRs 804 to adjust the cover gas pressures in the headspace of the tanks iteratively to achieve the target fluid height setpoints or approach the target fluid heights within a predetermined tolerance. The predefined tolerance may be less than or equal to one half inch of fluid height difference between the actual height and target height of fluid in the experimental tank. When the target fluid heights are achieved or approached within the predetermined tolerance, the EPRs 804 may hold the current cover gas pressures to maintain the current fluid levels. Otherwise, the EPRs are configured to calibrate the cover gas pressures using the following logic: if the fluid level in the sump tank is low, reduce the pressure level in the sump tank; if the fluid level in the experimental tank level is low, then increase the pressure level in the drain tank. The opposite logic is used when tank levels are too high.

Further, the control software in the computer 801 features tank overflow protection that is triggered by a low fluid level and a high fluid level. For example, the control software is configured to trigger an automatic controlled shutdown when detecting a low fluid level. In the controlled shutdown, the system prevents a negative pressure from forming in the sump tank, thereby preventing the fluid from bubbling as it drains into the drain tank. Since the controlled shutdown may not react fast enough, the fluid level of one or more of the tanks may continue to increase. If fluid level of a given tank reaches a high value, an automatic hard shutdown is triggered. In a hard shutdown, the tanks are rapidly depressurized, and bubbling will likely occur in the sump tank.

The control software in the computer 801 also includes data saving capabilities. The data saving can be toggled on and off by the user and the saved data includes EPR currents, cover gas pressures, tank fluid levels, pump status, and microphone data.

With reference to FIG. 9, a hardware diagram 900 is depicted corresponding to pressure control operations. Each tank is connected to an EPR and a relief valve. For example, EPR 903 is connected to the drain tank 933 and controls its cover gas pressure via the inlet/outlet ports 913 and relief valve 923. The relief valve 923 is configured to quickly vent the cover gas to depressurize the drain tank 933. The EPR 903 takes a 4-20 mA pressure control signal, representing a desired pressure for the EPR 903 to output into the associated drain tank 933. Increasing pressure in the drain tank 933 causes the fluid in the drain tank 933 to rise to the sump tank 932 and experimental tank. In sump tank 932, its associated EPR 902 controls its cover gas pressure via the inlet/outlet ports 912 and relief valve 922. The relief valve 922 is configured to quickly vent the cover gas to depressurize the sump tank 932. The EPR 902 also takes a 4-20 mA pressure control signal that represents a desired pressure for the EPR 902 to output into the sump tank 932. Increasing pressure in the sump tank 932 causes the fluid in the sump tank 932 to rise to the experimental tank and increases the cover gas pressure in the drain tank 933. Similarly, EPR 901 is connected to the experimental tank and controls its cover gas pressure via the inlet/outlet ports 911 and relief valve 921. The relief valve 921 is configured to quickly vent the cover gas to depressurize the experimental tank. The EPR 901 also takes a 4-20 mA pressure control signal that represents a desired pressure for the EPR 901 to output into the experimental tank. Increasing pressure in the experimental tank results in a system-wide increased cover gas pressure. When all the relief valves are open, the fluid will accumulate in the drain tank due to the geometry of the system. In this regard, the tanks in the system are sized so that the volume of fluid in the drain tank is greater than to the total fluid in the experimental tank, sump tank, and connecting pipes.

Figure 10:
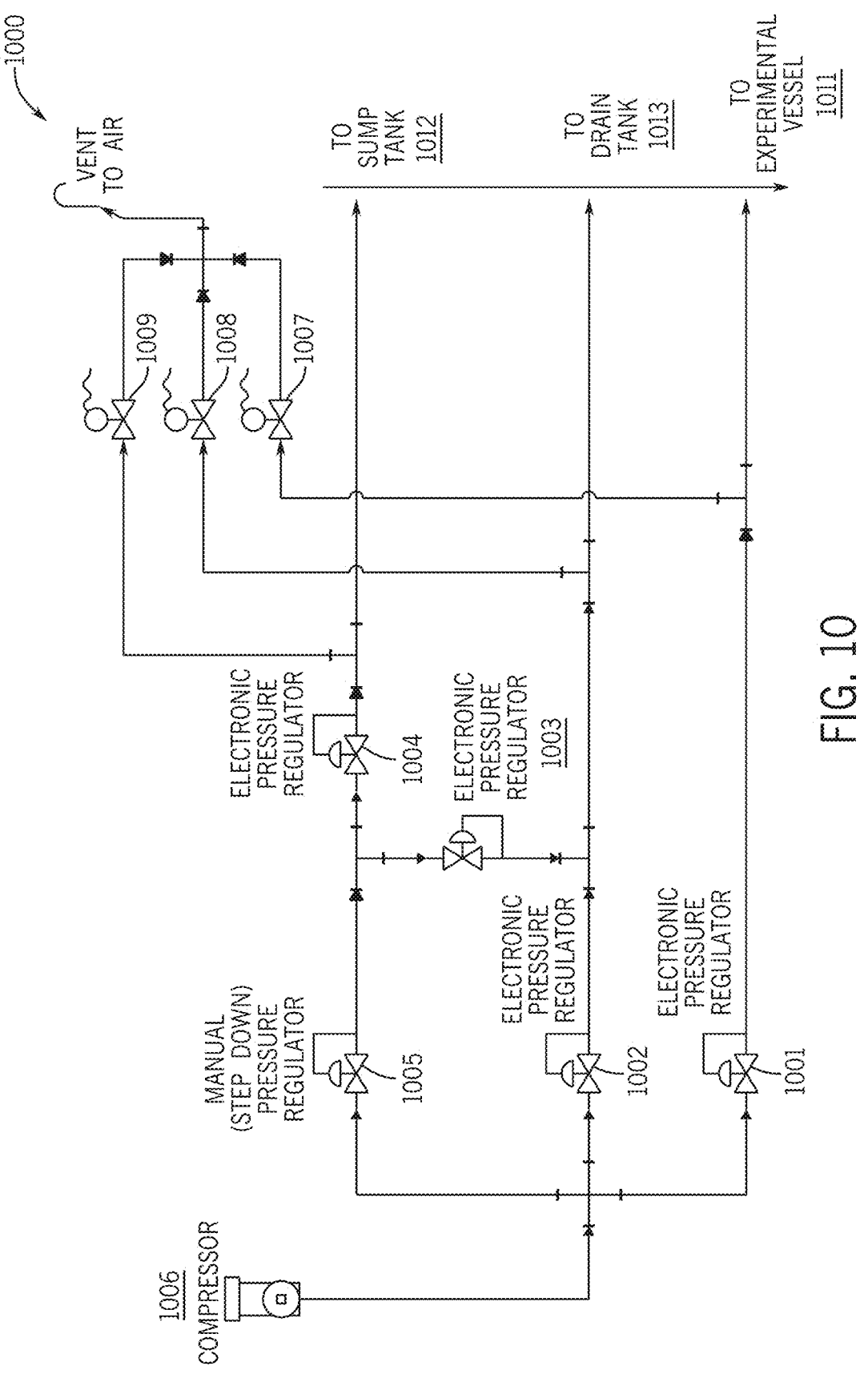
FIG. 10 depicts an example hydraulic schematic diagram for cover gas pressure control in a fluid level control system.

With reference to FIG. 10, a hydraulic schematic diagram is depicted corresponding to a cover gas pressure control system 1000. Each tank is connected to an EPR and a relief valve. The EPRs 1001, 1002, 1003, 1004, 1005 shown in FIG. 10 are further connected to a compressor 1006. The compressor 1006 is part of an inert gas system that is configured to deliver and to receive an inert gas from each of the headspace of the experimental tank 1011, the headspace of the sump tank 1012, and the headspace of the drain tank 1013. The EPRs 1001, 1002, 1003, 1004, 1005 are invoked to regulate the cover gas pressure in each tank, as described herein, thereby regulating the corresponding fluid level. For example, as illustrated in FIG. 8, the EPR of each tank is configured to increase the cover gas pressure by adding more compressed inert gas through the inlet port or reduce the pressure by releasing the inert gas through the inlet port. The relief valves 1007, 1008, 1009, as shown in FIG. 10, are further used to quickly vent the inert gas in each tank. When all the of the relief valves 1007, 1008, 1009 are open, the fluid will accumulate in the drain tank due to the geometry of the system. In this regard, the tanks in the system are sized so that the volume of fluid in the drain tank is greater than to the total fluid in the experimental tank, sump tank, and connecting pipes.

Figure 11:
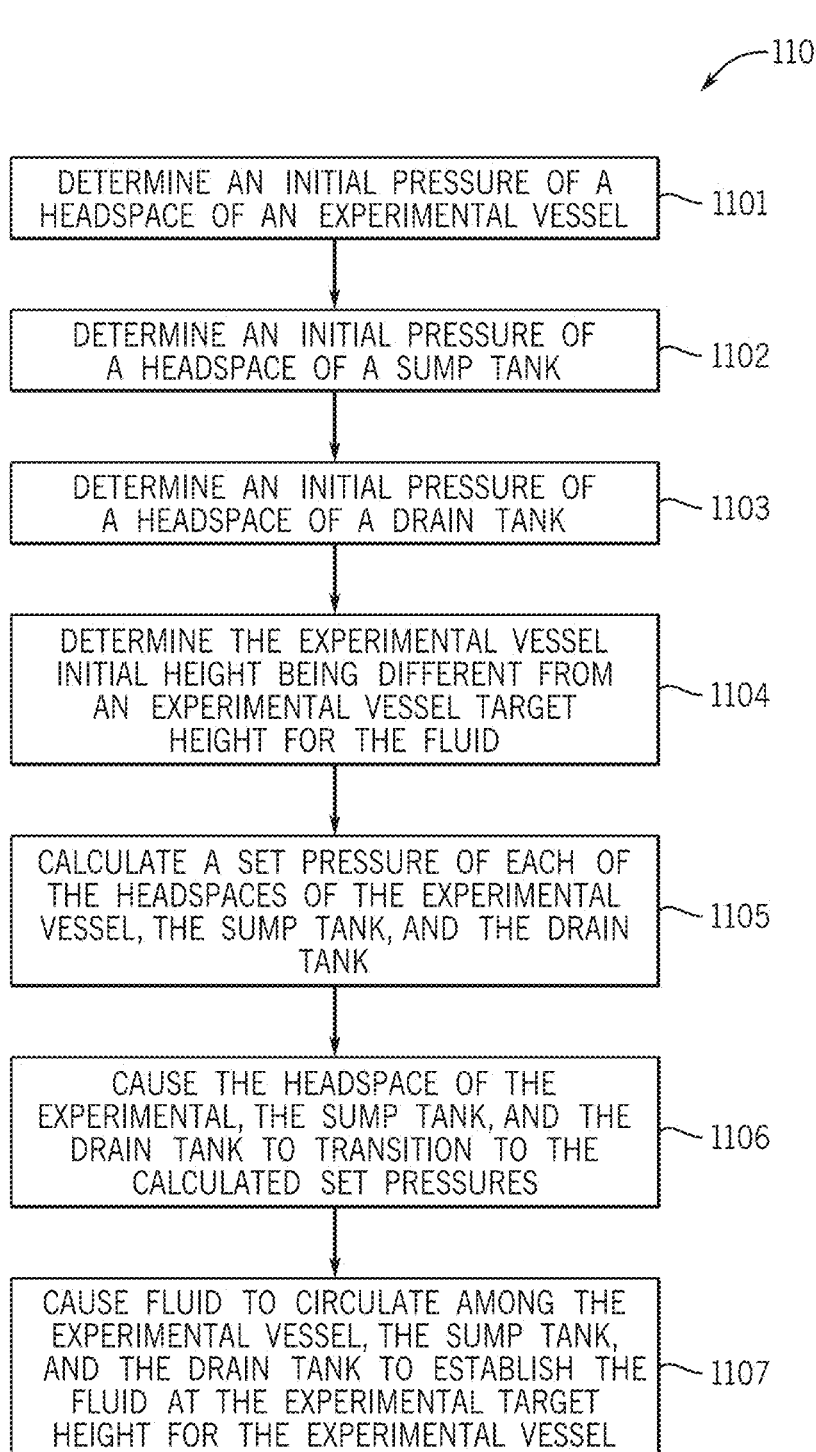
FIG. 11 depicts a flow diagram of an example method of controlling fluid levels in an experimental tank, a sump tank, and a drain tank.
Figure 12:
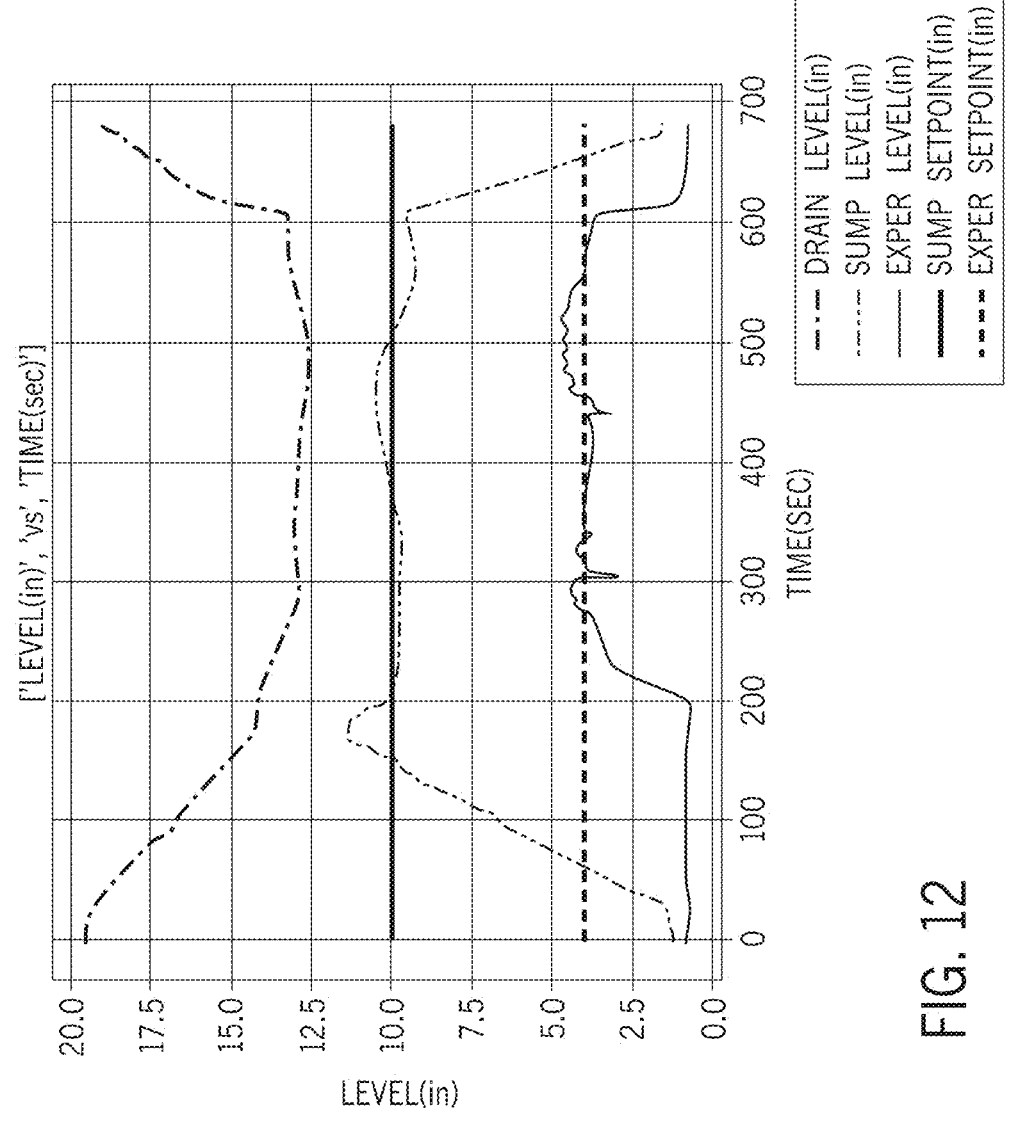
FIG. 12 is a graphical illustration of fluid level control in an experimental tank and a sump tank of a fluid control system according to a first embodiment.
Figure 13:
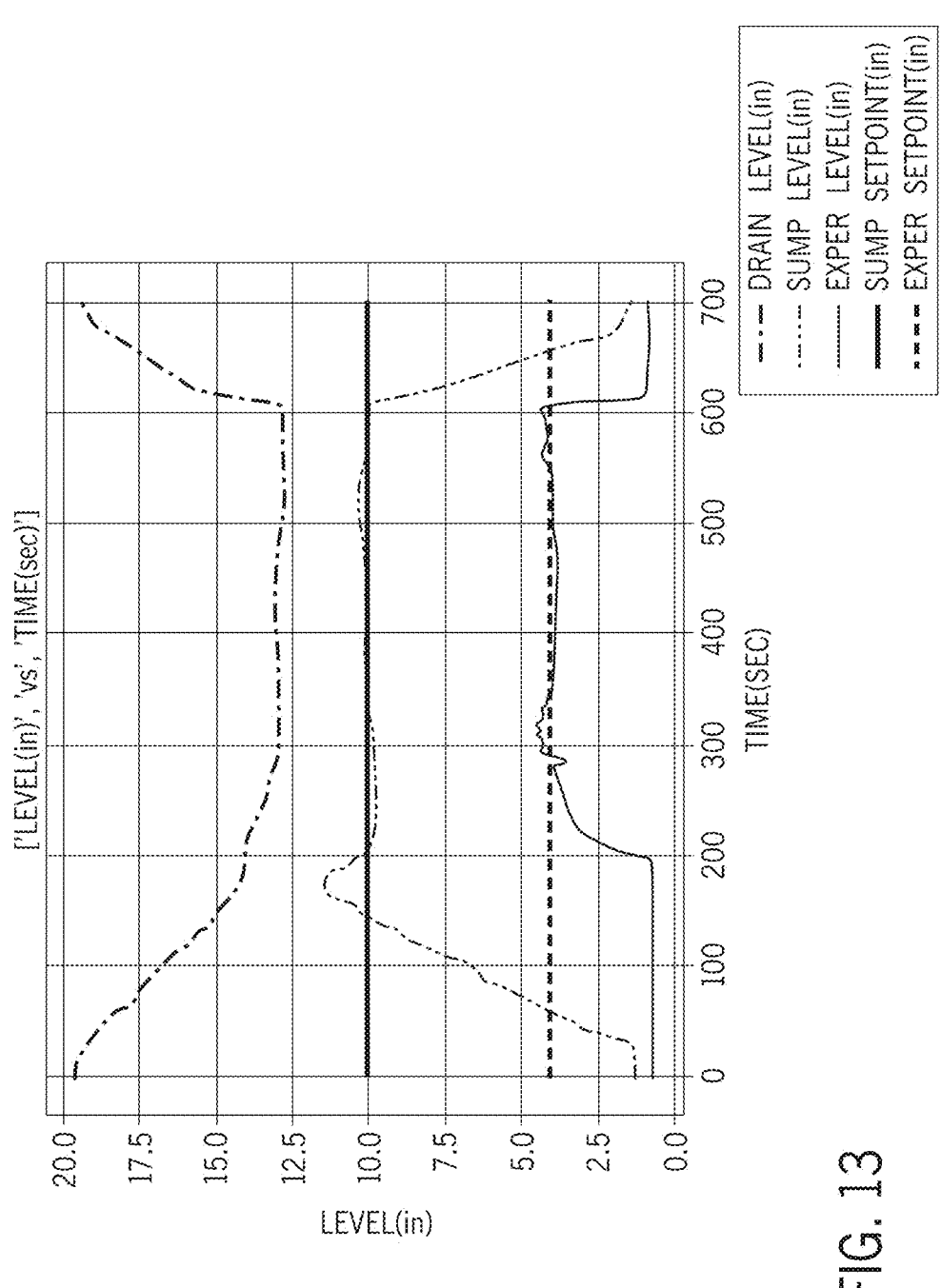
FIG. 13 is a graphical illustration of fluid level control in an experimental tank and a sump tank of a fluid control system according to a second embodiment.
Figure 14:
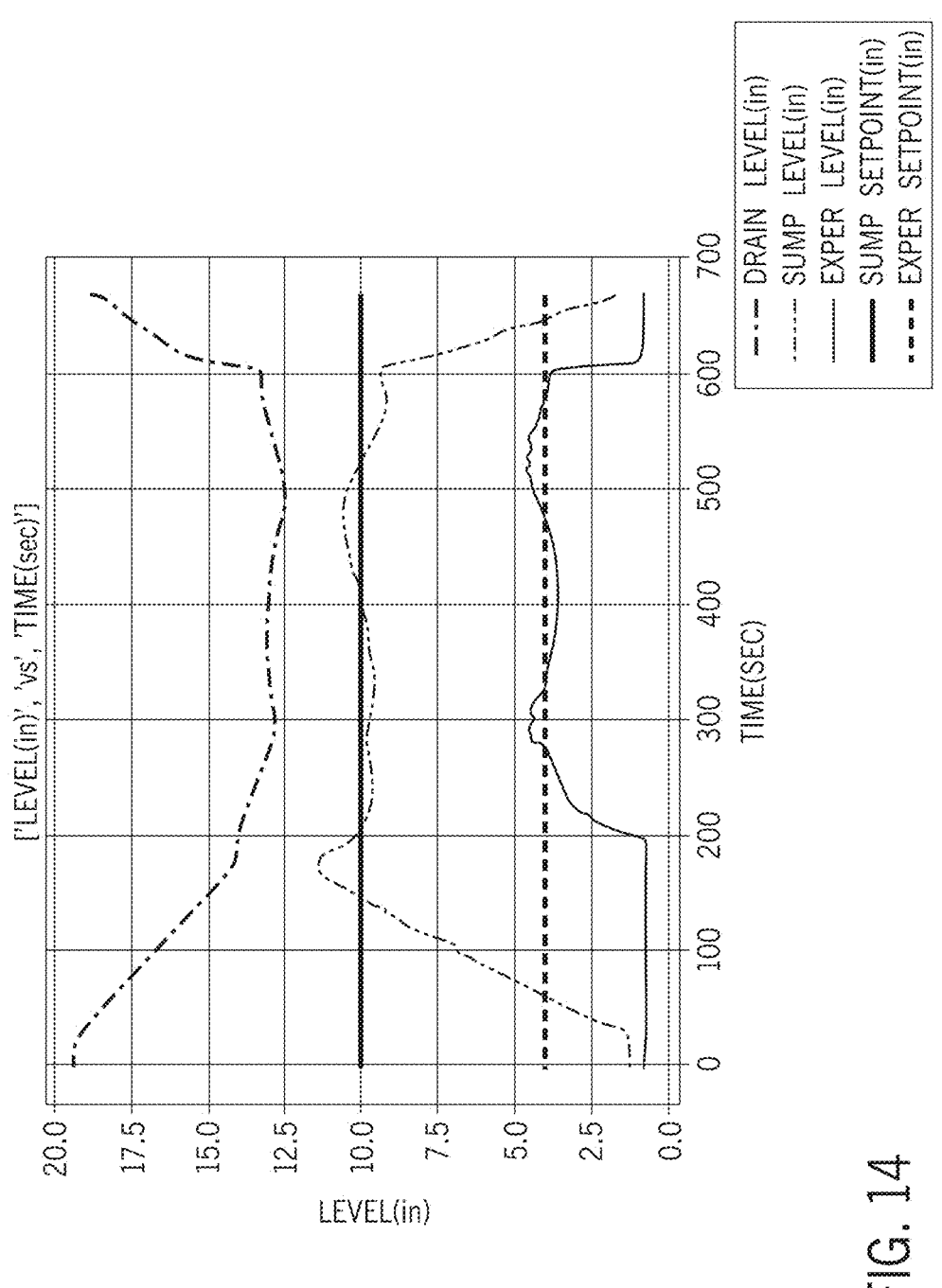
FIG. 14 is a graphical illustration of fluid level control in an experimental tank and a sump tank of a fluid control system according to a third embodiment.
Figure 15:
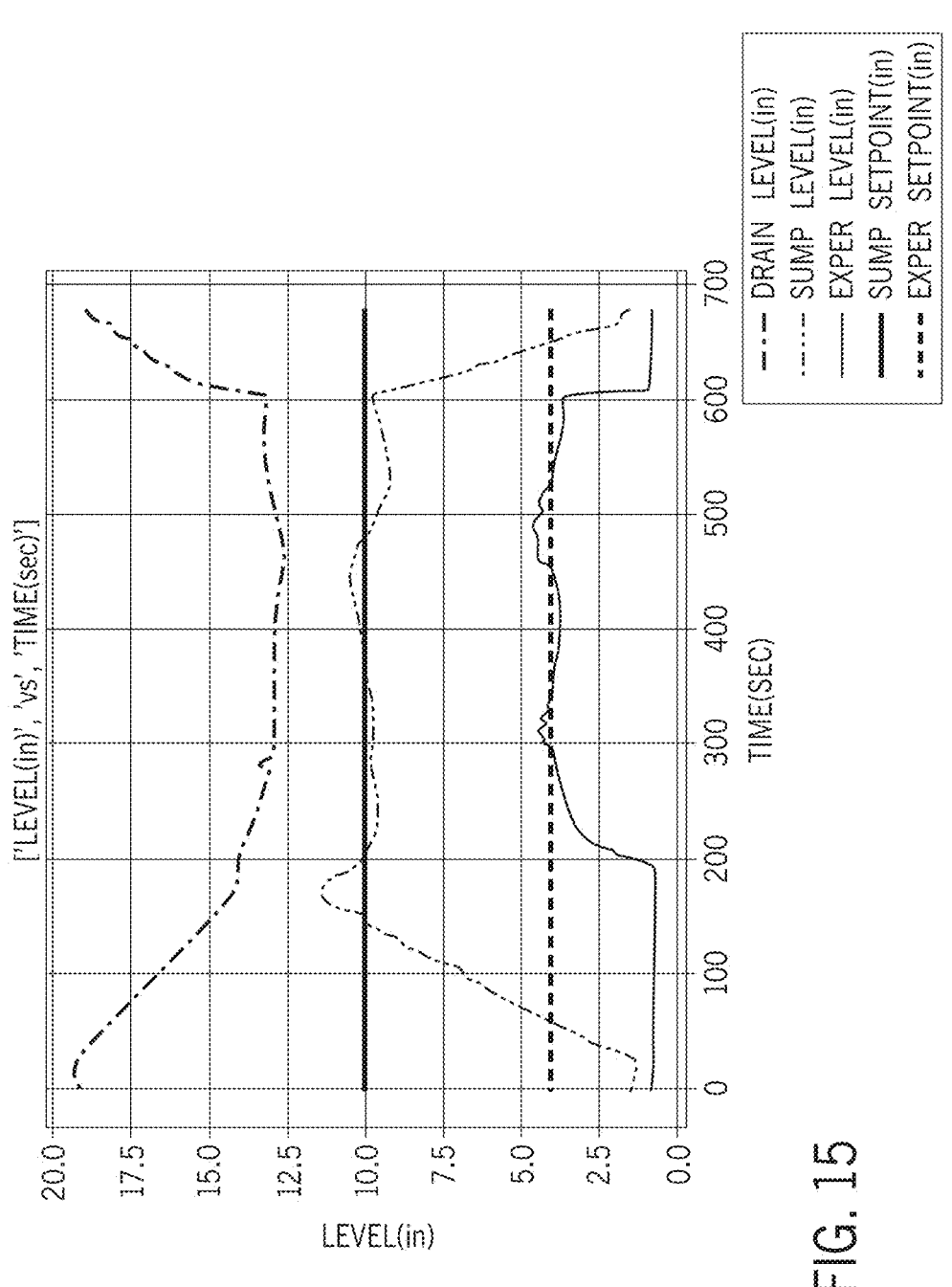
FIG. 15 is a graphical illustration of fluid level control in an experimental tank and a sump tank of a fluid control system according to a fourth embodiment.

FIG. 11 depicts a flow diagram of an example method for controlling fluid level in a molten salt reactor system. At operation 1101, a molten salt reactor system is configured to determine an initial cover gas pressure of a headspace of an experimental tank. As illustrated in FIGS. 3, 5, and 6, the molten salt reactor system includes a pressure transducer mounted on the top of the experimental tank, where the pressure transducer measures the cover gas pressure in the experimental tank. For example, the pressure transducer can be an Omega™ PX119-150AI Pressure Transmitter, which measures the pressure in range between 0 to 150 PSI with a 0.5% BFSL accuracy and transmits it as a 4 to 20 mA signal, where 0 PSI corresponds to 4 mA.

At operation 1102, the molten salt reactor system is configured to determine an initial cover gas pressure of a headspace of a sump tank. As illustrated in FIGS. 3, 5, and 6, a pressure transducer is mounted on the top of the sump tank, where the pressure transducer measures the cover gas pressure in the sump tank. Similar to the experimental tank, the pressure transducer can be an Omega™ PX119-150AI Pressure Transmitter, which measures the pressure in range between 0 to 150 PSI with a 0.5% BFSL accuracy and transmits it as a 4 to 20 mA signal, where 0 PSI corresponds to 4 mA.

At operation 1103, the molten salt reactor system determines an initial cover gas pressure of a headspace of a drain tank. As illustrated in FIGS. 3, 5, and 6, a pressure transducer is mounted on the top of the drain tank, where the pressure transducer measures the cover gas pressure in the sump tank. Similar to the experimental tank and sump tank, the pressure transducer in the drain tank can be an Omega™ PX119-150AI Pressure Transmitter, which measures the pressure in range between 0 to 150 PSI with a 0.5% BFSL accuracy and transmits it as a 4 to 20 mA signal, where 0 PSI corresponds to 4 mA.

At operation 1104, the measured initial cover gas pressures of the three tanks, e.g., experimental tank, sump tank, and drain tank, are transmitted to a data acquisition module. As discussed in FIG. 8, the data acquisition module includes a NI-DAQ hardware, such as a NI Compact DAQ system. The NI Compact DAQ system uses an NI 9203 Current Input Module to measure signals from the plurality of fluid level sensors and a plurality of pressure transducers. Then the data acquisition module sends the measured initial cover gas pressures to a computer.

At operation 1105, the computer receives the measured initial cover gas pressures from the experimental tank, sump tank, and drain tank. The computer includes a control software that determines the initial fluid level associated with the initial cover gas pressure in experimental tank being different from a target fluid level.

At operation 1106, the control software calculates a set cover gas pressure of each of the headspaces of the experimental tank, sump tank, and drain tank. With reference to FIG. 4, the control software takes inputs of the initial cover gas pressure of the experimental tank $P_e$, the initial cover gas pressure of the sump tank $P_s$, the initial cover gas pressure of the drain tank $P_d$, vertical height between the bottom of the drain tank and the bottom of the experimental tank $h_{de}$, vertical height between the bottom of the drain tank and the bottom of the sump tank $d_{ds}$, cross-sectional area of the experimental tank $A_e$, cross-sectional area of the sump tank $A_s$, cross-sectional area of the drain tank $A_d$, total fluid volume in the system $V_t$, fluid volume in the pipes connecting all of the tanks in the system $V_p$, and weight factor of the fluid in the system $\gamma$. The output results are the target heights for the fluid in the experimental tank $h_e$, sump tank $h_s$, and drain tank $h_d$.

At operations 1107, the control software transmits the target heights as the pressure control signals to the EPRs mounted on the experimental tank, sump tank, and drain tank, respectively, through the data acquisition module. The EPR of each tank is configured to calibrate the cover gas pressure by pressurizing or depressurizing the tank. As discussed in FIG. 9, the EPR is configured to add compressed gas from the inlet port to increase the pressure or releasing the cover gas from the outlet port to decrease the pressure.

At operation 1108, pressurization and/or depressurization cause the fluid in the system to circulate among the experimental tank, sump tank, and drain tank. For example, increasing pressure in the drain tank causes the fluid in the drain tank to rise to the sump tank and experimental tank, resulting in the increment of the fluid levels system wide. Increasing pressure in the sump tank causes the fluid in the sump tank to rise to the experimental tank and increases the cover gas pressure in the drain tank. Increasing pressure in the experimental tank results in a system-wide increased cover gas pressure. Ultimately, the EPRs of the experimental tank, sump tank, and drain tank are configured to adjust the cover gas pressures to establish the fluid level at the target height in the experimental tank. When the target fluid height is achieved or approached within a predetermined tolerance, the EPRs may hold the current cover gas pressures to maintain the current fluid levels. Otherwise, the EPRs are configured to calibrate the cover gas pressures using the following logic: if the fluid level in the sump tank is low, reduce the pressure level in the sump tank; if the fluid level in the experimental tank level is low, then increase the pressure level in the drain tank. The opposite logic is used when tank levels are too high.

FIGS. 12-15 illustrate four demonstrations of any of the fluid control systems described herein. In each of the figure, real-time fluid levels of the experimental tank, sump tank, and drain tank are monitored. The fluid control system is configured to control the cover gas pressures to achieve the target fluid levels in the sump tank and experimental tank within 300 seconds.

Figure 16:
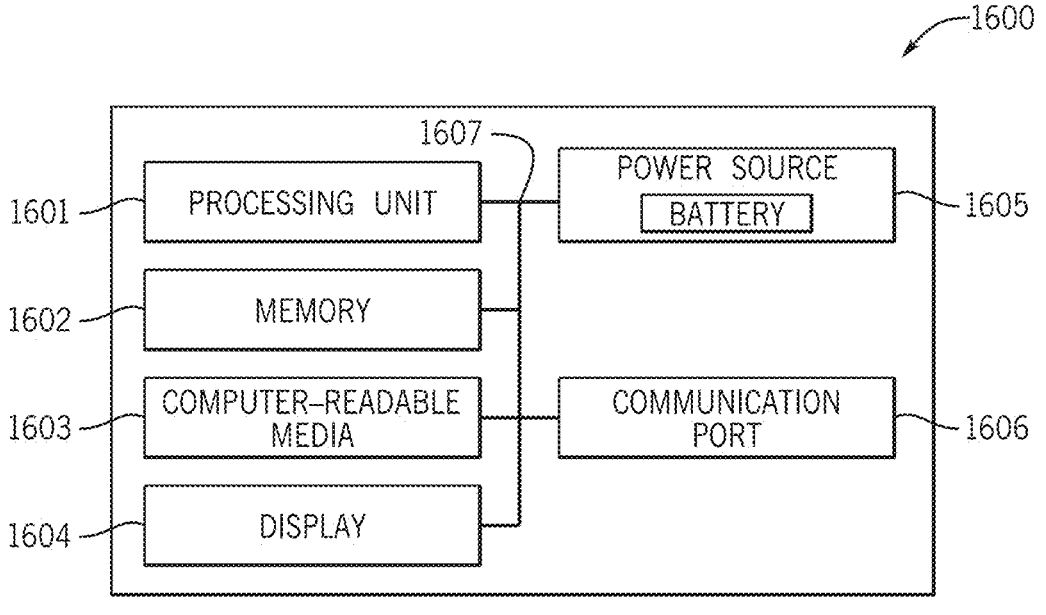
FIG. 16 depicts a functional block diagram of a system including a control device.

FIG. 16 presents an illustrative control system 1600. The schematic representation in FIG. 16 is generally representative of any types of systems and configurations that may be used to receive a sensor signal in accordance with the embodiments described herein. For example, the control system 1600 may be used with or included within any of the EPR, sensors, transmitters, computers, or computer modules described herein. In this regard, the control system 1600 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

As shown in FIG. 16, the control system 1600 may include a processing unit or element 1601 operatively connected to computer memory 1602 and computer-readable media 1603. The processing unit 1601 may be operatively connected to the memory 1602 and computer-readable media 1603 components via an electronic bus or bridge (e.g., such as system bus 1607). The processing unit 1601 may include one or more computer processors or microcontrollers that are configured to perform operations in response to computer-readable instructions. The processing element 1601 may be a central processing unit of control system 1600. Additionally or alternatively, the processing unit 1601 may be other processors within the device including application specific integrated chips (ASIC) and other microcontroller devices.

The memory 1602 may include a variety of types of non-transitory computer-readable storage media, including, for example, read access memory (RAM), read-only memory (ROM), erasable programmable memory (e.g., EPROM and EEPROM), or flash memory. The memory 1602 is configured to store computer-readable instructions, sensor values, and other persistent software elements. Computer-readable media 1603 may also include a variety of types of non-transitory computer-readable storage media including, for example, a hard-drive storage device, a solid state storage device, a portable magnetic storage device, or other similar device. The computer-readable media 1603 may also be configured to store computer-readable instructions, sensor values, and other persistent software elements.

In this example, the processing unit 1601 is operable to read computer-readable instructions stored on the memory 1602 and/or computer-readable media 1603. The computer-readable instructions may adapt the processing unit 1601 to perform the operations or functions described above with respect to FIGS. 1-11. The computer-readable instructions may be provided as a computer-program product, software application, or the like.

As shown in FIG. 16, the control system 1600 may also include a display 1604. The display 1604 may include a liquid-crystal display (LCD), organic light emitting diode (OLED) display, light emitting diode (LED) display, or the like. If the display 1604 is an LCD, the display may also include a backlight component that can be controlled to provide variable levels of display brightness. If the display 1604 is an OLED or LED type display, the brightness of the display 1604 may be controlled by modifying the electrical signals that are provided to display elements.

The control system 1600 may also include a battery 1605 that is configured to provide electrical power to the components of control system 1600. The battery 1605 may include one or more power storage cells that are linked together to provide an internal supply of electrical power. In this regard, the battery 1605 may be a component of a power source 1605 (e.g., including a charging system or other circuitry that supplies electrical power to components of the control system 1600). The battery 1605 may be operatively coupled to power management circuitry that is configured to provide appropriate voltage and power levels for individual components or groups of components within the control system 1600. The battery 1605, via power management circuitry, may be configured to receive power from an external source, such as an AC power outlet or interconnected computing device. The battery 1605 may store received power so that the control system 1600 may operate without connection to an external power source for an extended period of time, which may range from several hours to several days.

The control system 1600 may also include a communication port 1606 that is configured to transmit and/or receive signals or electrical communication from an external or separate device. The communication port 1606 may be configured to couple to an external device via a cable, adaptor, or other type of electrical connector. In some embodiments, the communication port 1606 may be used to couple the control system 1600 with a computing device and/or other appropriate accessories configured to send and/or receive electrical signals. The communication port 1606 may be configured to receive identifying information from an external accessory, which may be used to determine a mounting or support configuration. For example, the communication port 1606 may be used to determine that the control system 1600 is coupled to a mounting accessory, such as a particular type of stand or support structure.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A system for controlling a fluid level of an experimental tank, the system comprising the experimental tank associated with a first pressure transducer and having a fluid contained therein occupying an experiential tank fluid initial height;

a sump tank associated with a second pressure transducer and having a fluid contained therein occupying a sump tank fluid initial height, the sump tank being elevationally below the experimental tank, a headspace of the sump tank and the fluid of the sump tank each fluidically coupled with the experimental tank to define a fluid control circuit therebetween;

a drain tank associated with a third pressure transducer and having a fluid contained therein occupying a drain tank fluid initial height, the drain tank being elevationally below the sump tank, the fluid of the drain tank being fluidically couplable with the fluid control circuit;

the experimental tank, the sump tank, and the drain tank being fluidically coupled to each other via one or more pipes;

an inert gas system configured to deliver and to receive an inert gas from each of a headspace of the experimental tank, the headspace of the sump tank, and a headspace of the drain tank; and a control module operatively coupled with each of the first pressure transducer, the second pressure transducer, and the third pressure transducer and the inert gas system and configured to calculate a set target pressure for each of the headspaces of the experimental tank, the sump tank, and the drain tank based on an experimental tank fluid target height, a sump tank fluid target height, and a drain tank fluid target height, and cause the headspaces of the experimental tank, the sump tank, and the drain tank to transition to the calculated set target pressures and cause the fluid to circulate through the fluid control circuit and among the experimental tank, the sump tank, and the drain tank to establish the fluid at the experimental tank fluid target height for the experimental tank, at the sump tank fluid target height for the sump tank, and at the drain tank fluid target height for the drain tank.

2. The system of claim 1, wherein the inert gas system comprises a first electronic proportional regulator associated with an experimental inert gas circuit with the experimental tank, a second electronic proportional regulator associated with a sump inert gas circuit with the sump tank, and a third electronic proportional regulator associated with a drain inert gas circuit with the drain tank, and the control module is further configured to invoke each of the first electronic proportional regulator, the second electronic proportional regulator, and the third electronic proportional regulator in order to cause said transition to the calculated set target pressures.

3. The system of claim 2, wherein the system further comprises a first level sensor associated with the experimental tank, a second level sensor associated with the sump tank, and a third level sensor associated with the drain tank;

the control module is further configured to determine, using the first level sensor, the experimental tank fluid initial height and an experimental tank fluid actual height, determine, using the second level sensor, the sump tank fluid initial height and a sump tank fluid actual height, and determine, using the third level sensor, the drain tank fluid initial height and a drain tank fluid actual height, the experimental tank fluid actual height, the sump tank fluid actual height, and the drain tank fluid actual height responsive to the invoking by the control module.

4. The system of claim 3, wherein the control module is further configured to iteratively invoke each of the first electronic proportional regulator, the second electronic proportional regulator, and the third electronic proportional regulator in order to cause said transition to the calculated set pressures based on a difference between the determined experimental tank fluid actual height, sump tank fluid actual height, and the drain tank fluid actual height and the corresponding experimental tank fluid target height, sump tank fluid target height, or drain tank fluid target height.

5. The system of claim 4, further comprising a pump that is at least partially submerged in the fluid of the sump tank and configured to cause the circulation of the fluid through the fluid control circuit.

6. The system of claim 5, wherein the fluid comprises a molten salt.

7. A molten salt reactor system comprising a reactor vessel including a molten salt circulating there-through, the reactor vessel configured to heat the molten salt by fission reactions; and the system of claim 1, wherein the experimental tank is fluidically coupled with the reactor vessel.

8. The molten salt reactor system of claim 7, wherein the experimental tank defines a reactor access vessel, the reactor access vessel extending from a headspace of the reactor vessel.

9. The molten salt reactor system of claim 7, wherein the molten salt reactor system further comprises a reactor pump, a heat exchanger, and a drain that are each arranged fluidically along a molten salt loop with the reactor vessel and configured for the circulation of the molten salt therealong, and the experimental tank is positioned along and fluidically coupled to the molten salt loop.

10. The molten salt reactor system of claim 7, wherein the experimental tank defines one vessel of a molten salt test system.

\* \* \* \* \*